(12) United States Patent
Calcev et al.

(10) Patent No.: US 12,259,456 B2
(45) Date of Patent: Mar. 25, 2025

(54) SYSTEM AND METHOD FOR DETERMINING LINE OF SIGHT (LOS)

(71) Applicant: Huawei Technologies Co., Ltd., Shenzhen (CN)

(72) Inventors: George Calcev, Hoffman Estates, IL (US); Philippe Sartori, Plainfield, IL (US); Weimin Xiao, Hoffman Estates, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 643 days.

(21) Appl. No.: 17/198,934

(22) Filed: Mar. 11, 2021

(65) Prior Publication Data

US 2021/0239783 A1 Aug. 5, 2021

Related U.S. Application Data

(63) Continuation of application No. PCT/US2019/046782, filed on Aug. 16, 2019.
(Continued)

(51) Int. Cl.
*G01S 5/02* (2010.01)
*G01S 11/08* (2006.01)
*H04B 7/10* (2017.01)

(52) U.S. Cl.
CPC .......... *G01S 11/08* (2013.01); *G01S 5/0215* (2013.01); *H04B 7/10* (2013.01)

(58) Field of Classification Search
CPC . G01S 5/0215; G01S 5/14; G01S 5/21; G01S 5/0284; G01S 5/0252;
(Continued)

(56) References Cited

U.S. PATENT DOCUMENTS 5,842,130 A * 11/1998 Oprescu-Surcobe ........................ H04W 64/00 455/456.2
9,253,592 B1 * 2/2016 Moscovich ............. H04W 4/80
(Continued)

FOREIGN PATENT DOCUMENTS

WO  WO-2008077991 A1 * 7/2008 ........... G01S 5/0215
WO  2013023225 A1 2/2013
(Continued)

OTHER PUBLICATIONS

"Gosan Noh et al., Non-Orthogonal Dual-Polarization via Polarization-Domain Rotation, Feb. 2014, IEEE, 2014 Asia-Paciffic Conference on Computer Aided System Engineering, pp. 54-58" (Year: 2014).*
(Continued)

*Primary Examiner* — Rasheed Gidado
(74) *Attorney, Agent, or Firm* — Slater Matsil, LLP

(57) ABSTRACT

A method performed by a first device includes communicating, with a second device, a LOS determination request including a dual polarization procedure indicator indicating a dual polarization procedure is used in LOS characterization of a transmission between the first device and the second device, measuring a first signal on a first resource of a channel, and measuring a second signal on a second resource of the channel, with the first and second signals comprising a single bit sequence with orthogonal polarizations and are multiplexed in a frequency domain or a code domain.

38 Claims, 14 Drawing Sheets

Related U.S. Application Data

(60) Provisional application No. 62/746,472, filed on Oct. 16, 2018, provisional application No. 62/738,845, filed on Sep. 28, 2018.

(58) Field of Classification Search
CPC ........ G01S 5/0218; G01S 11/02; G01S 11/08; G01S 11/06; G01S 11/04; H04W 64/00; H04W 64/003; H04W 4/02; H04B 7/0617; H04B 7/10
See application file for complete search history.

(56) References Cited

U.S. PATENT DOCUMENTS

| | | | |
|---|---|---|---|
| 9,264,124 B2 | 2/2016 | Wu et al. | |
| 9,596,019 B2* | 3/2017 | Asplund | H01Q 1/246 |
| 10,466,337 B2* | 11/2019 | Amizur | G01S 5/0218 |
| 10,951,345 B2* | 3/2021 | Matsuda | H04B 10/614 |
| 2014/0206367 A1 | 7/2014 | Agee et al. | |
| 2015/0382318 A1* | 12/2015 | Kim | G01S 5/0054 |
| | | | 455/456.5 |
| 2016/0149302 A1* | 5/2016 | Sanderovich | H01Q 3/24 |
| | | | 343/703 |
| 2017/0212208 A1* | 7/2017 | Baek | H04B 17/309 |
| 2017/0338874 A1 | 11/2017 | Pratt et al. | |
| 2019/0364449 A1* | 11/2019 | Yang | H04W 72/04 |
| 2020/0045608 A1* | 2/2020 | Calcev | H04B 7/0617 |
| 2020/0091608 A1 | 3/2020 | Alpman et al. | |

FOREIGN PATENT DOCUMENTS

| | | |
|---|---|---|
| WO | 2014089999 A1 | 6/2014 |
| WO | 2018027813 A1 | 2/2018 |
| WO | WO-2018063567 A1 * | 4/2018 |

OTHER PUBLICATIONS

WO 2008/077991 A1 (Year: 2008).*

* cited by examiner

SYSTEM AND METHOD FOR DETERMINING LINE OF SIGHT (LOS)

CROSS-REFERENCE TO RELATED APPLICATIONS

This application is a continuation of Application No PCT/US2019/046782, filed on Aug. 16, 2019, which claims the benefit of U.S. Provisional Application No. 62/738,845, filed on Sep. 28, 2018, entitled "Method for LOS Determination," and U.S. Provisional Application No. 62/746,472, filed Oct. 16, 2018, entitled "Method and Apparatus for Determining Line of Sight (LOS)," which applications are hereby incorporated herein by reference in their entirety.

TECHNICAL FIELD

The present disclosure relates generally to a system and method for digital communications, and, in particular embodiments, to a system and method for determining line of sight (LOS).

BACKGROUND

A time of flight (ToF) is used in many applications to estimate the distance between a transmitter and a receiver. The ToF is defined as a duration of propagation of a wave signal between the transmitter and the receiver. One way to estimate ToF is based on exchanging multiple frames with time stamps between the transmitter and the receiver. When the ToF is determined, a simple multiplication with the speed of light provides an estimation of the distance between transmitter and the receiver. Once the distance from an unknown location to at least three fixed points (with known coordinates) is determined, a simple triangulation (multi-lateration) algorithm could be used to obtain the location of the unknown point.

When the line of sight (LOS) path between transmitter and receiver is not available and the communication is only non-line of sight (NLOS), several copies of the transmitted signal are received due to reflections, where each copy of the signal corresponds to a different path of the propagation between transmitter and receiver and therefore has a different ToF. In the case of NLOS, the ToF for each path corresponds to the length of the path rather than to the geometric distance between the transmitter and the receiver. In this case, the path length based on the ToF is obviously larger than the actual distance between the transmitter and the receiver, which in turn leads to error in the estimation of the location.

Therefore, there is a need to know if the signal propagation for a transmission (or a copy of it) corresponds to the LOS propagation in order to determine the exact distance between the transmitter and the receiver.

SUMMARY

According to a first aspect, a method performed by a first device is provided. The method includes communicating, by the first device, with a second device, a line of sight (LOS) determination request including a dual polarization procedure indicator indicating a dual polarization procedure is used in LOS characterization of a transmission between the first device and the second device, measuring, by the first device, a first signal on a first resource of a channel, and measuring, by the first device, a second signal on a second resource of the channel, with the first and second signals comprising a single bit sequence with orthogonal polarizations and are multiplexed in a frequency domain or a code domain.

In a first implementation form of the method according to the first aspect as such, measuring the first signal comprising measuring, by the first device, a linear average of the power contributions of the first resource conveying the first signal, and measuring the second signal comprising measuring, by the first device, a linear average of the power contributions of the second resource conveying the second signal.

In a second implementation form of the method according to the first aspect as such or any preceding implementation form of the first aspect, further comprising transmitting, by the first device, to the second device, a measurement of the first signal and a measurement of the second signal.

In a third implementation form of the method according to the first aspect as such or any preceding implementation form of the first aspect, further comprising receiving, by the first device, from the second device, the LOS characterization of the transmission.

In a fourth implementation form of the method according to the first aspect as such or any preceding implementation form of the first aspect, further comprising determining, by the first device, that a difference between a measurement of the first signal and a measurement of the second signal meets a specified threshold, and based thereon, determining, by the first device, that the LOS characterization of the transmission comprises a LOS transmission.

In a fifth implementation form of the method according to the first aspect as such or any preceding implementation form of the first aspect, further comprising determining, by the first device, a difference between a measurement of the first signal and a measurement of the second signal does not meet a specified threshold, and based thereon, determining, by the first device, that the LOS characterization of the transmission comprises a non-LOS (NLOS) transmission.

In a sixth implementation form of the method according to the first aspect as such or any preceding implementation form of the first aspect, further comprising transmitting, by the first device, the LOS characterization of the transmission.

In a seventh implementation form of the method according to the first aspect as such or any preceding implementation form of the first aspect, measuring the first signal or measuring the second signal comprises measuring a reference signal received power (RSRP) value or a reference signal received quality (RSRQ) value.

In an eighth implementation form of the method according to the first aspect as such or any preceding implementation form of the first aspect, communicating the LOS determination request comprises transmitting the LOS determination request or receiving the LOS determination request.

In a ninth implementation form of the method according to the first aspect as such or any preceding implementation form of the first aspect, the first device comprising a user equipment (UE), and the second device comprising an access node.

In a tenth implementation form of the method according to the first aspect as such or any preceding implementation form of the first aspect, the LOS determination request further comprises a measurement gap specifying a location of the first and second resources.

In an eleventh implementation form of the method according to the first aspect as such or any preceding implementation form of the first aspect, the LOS determination request further comprises a first measurement gap specifying a location of the first resource, and a second measurement gap specifying a location of the second resource.

In a twelfth implementation form of the method according to the first aspect as such or any preceding implementation form of the first aspect, the first and second signals are scrambled with different orthogonal codes.

According to a second aspect, a performed by a first device is provided. The method includes communicating, by the first device, with a second device, a LOS determination request including a dual polarization procedure indicator indicating a dual polarization procedure is used in LOS characterization of a transmission between the first device and the second device, transmitting, by the first device, a first signal on a first resource of a channel, and transmitting, by the first device, a second signal on a second resource of the channel, with the first and second signals comprising a single bit sequence with orthogonal polarization and are multiplexed in a frequency domain or a code domain.

In a first implementation form of the method according to the second aspect as such, further comprising receiving, by the first device, from the second device, a measurement of the first signal and a measurement of the second signal.

In a second implementation form of the method according to the second aspect as such or any preceding implementation form of the second aspect, further comprising determining, by the first device, that a difference between the measurement of the first signal and the measurement of the second signal meets a specified threshold, and based thereon, determining, by the first device, that the LOS characterization of the transmission comprises a LOS transmission.

In a third implementation form of the method according to the second aspect as such or any preceding implementation form of the second aspect, further comprising determining, by the first device, that a difference between the measurement of the first signal and the measurement of the second signal does not meet a specified threshold, and based thereon, determining, by the first device, that the LOS characterization of the transmission comprises a NLOS transmission.

In a fourth implementation form of the method according to the second aspect as such or any preceding implementation form of the second aspect, further comprising transmitting, by the first device, the LOS characterization of the transmission.

In a fifth implementation form of the method according to the second aspect as such or any preceding implementation form of the second aspect, further comprising receiving, by the first device, from the second device, a LOS characterization of the channel.

In a sixth implementation form of the method according to the second aspect as such or any preceding implementation form of the second aspect, communicating the LOS determination request comprises transmitting the LOS determination request or receiving the LOS determination request.

According to a third aspect, a first device is provided. The first device includes a non-transitory memory storage comprising instructions, and one or more processors in communication with the memory storage. The one or more processors execute the instructions to communicate, with a second device, a LOS determination request including a dual polarization procedure indicator indicating a dual polarization procedure is used in LOS characterization of a transmission between the first device and the second device, measure a first signal on a first resource of a channel, and measure a second signal on a second resource of the channel, with the first and second signals comprising a single bit sequence with orthogonal polarizations and are multiplexed in a frequency domain or a code domain.

In a first implementation form of the first device according to the third aspect as such, the one or more processors further execute the instructions to transmit, to the second device, a measurement of the first signal and a measurement of the second signal.

In a second implementation form of the first device according to the third aspect as such or any preceding implementation form of the third aspect, the one or more processors further execute the instructions to receive, from the second device, the LOS characterization of the transmission.

In a third implementation form of the first device according to the third aspect as such or any preceding implementation form of the third aspect, the one or more processors further execute the instructions to determine that a difference between a measurement of the first signal and a measurement of the second signal meets a specified threshold, and based thereon determine that the LOS characterization of the transmission comprises a LOS transmission.

In a fourth implementation form of the first device according to the third aspect as such or any preceding implementation form of the third aspect, the one or more processors further execute the instructions to determine a difference between a measurement of the first signal and a measurement of the second signal does not meet a specified threshold, and based thereon determine that the LOS characterization of the transmission comprises a NLOS transmission.

In a fifth implementation form of the first device according to the third aspect as such or any preceding implementation form of the third aspect, the one or more processors further execute the instructions to transmit the LOS characterization of the transmission.

In a sixth implementation form of the first device according to the third aspect as such or any preceding implementation form of the third aspect, the one or more processors further execute the instructions to transmit the LOS determination request or receive the LOS determination request.

According to a fourth aspect, a first device is provided. The first device includes a non-transitory memory storage comprising instructions, and one or more processors in communication with the memory storage. The one or more processors execute the instructions to communicate, with a second device, a LOS determination request including a dual polarization procedure indicator indicating a dual polarization procedure is used in LOS characterization of a transmission between the first device and the second device, transmit a first signal on a first resource of a channel, and transmit a second signal on a second resource of the channel, with the first and second signals comprising a single bit sequence with orthogonal polarization and are multiplexed in a frequency domain or a code domain.

In a first implementation form of the first device according to the fourth aspect as such, the one or more processors further execute the instructions to receive, from the second device, a measurement of the first signal and a measurement of the second signal.

In a second implementation form of the first device according to the fourth aspect as such or any preceding implementation form of the fourth aspect, the one or more processors further execute the instructions to determine that a difference between the measurement of the first signal and the measurement of the second signal meets a specified threshold, and based thereon, determine that the LOS characterization of the transmission comprises a LOS transmission.

In a third implementation form of the first device according to the fourth aspect as such or any preceding implementation form of the fourth aspect, the one or more processors further execute the instructions to determine that a difference between the measurement of the first signal and the measurement of the second signal does not meet a specified threshold, and based thereon, determine that the LOS characterization of the transmission comprises a NLOS transmission.

In a fourth implementation form of the first device according to the fourth aspect as such or any preceding implementation form of the fourth aspect, the one or more processors further execute the instructions to transmit the LOS characterization of the transmission.

In a fifth implementation form of the first device according to the fourth aspect as such or any preceding implementation form of the fourth aspect, the one or more processors further execute the instructions to receive, from the second device, a LOS characterization of the channel.

An advantage of an example embodiment is that the power consumption associated with monitoring reference signals is reduced, thereby reducing the overall power consumption of a communications device.

Yet another advantage of an example embodiment is that the number of reference signal monitoring occasions is reduced, further reducing the overall power consumption of the communications device.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

In the following description, reference is made to the accompanying drawings that form a part hereof, and in which is shown by way of illustration specific example embodiments which may be practiced. These example embodiments are described in sufficient detail to enable those skilled in the art to practice the disclosure, and it is to be understood that other example embodiments may be utilized and that structural, logical and electrical changes may be made without departing from the scope of the present disclosure. The following description of example embodiments is, therefore, not to be taken in a limited sense, and the scope of the present disclosure is defined by the appended claims.

The making and using of embodiments of this disclosure are discussed in detail below. It should be appreciated, however, that the concepts disclosed herein can be embodied in a wide variety of specific contexts, and that the specific example embodiments discussed herein are merely illustrative and do not serve to limit the scope of the claims. Further, it should be understood that various changes, substitutions and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

The functions or algorithms described herein may be implemented in software in one example embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the example embodiments described are merely examples. The software may be executed on a digital signal processor, ASIC, microprocessor, or other type of processor operating on a computer system, such as a personal computer, server or other computer system, turning such computer system into a specifically programmed machine.

Figure 1:
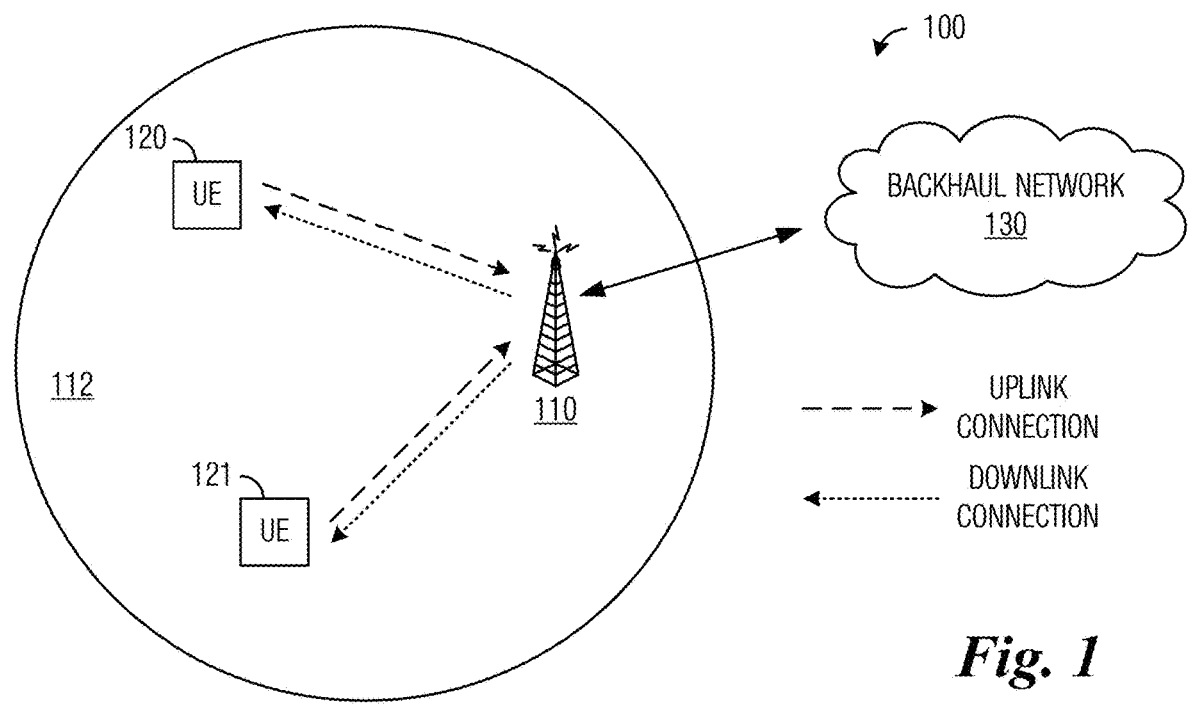
FIG. 1 illustrates a network for communicating data.

FIG. 1 illustrates a network 100 for communicating data. The network 100 comprises an access node 110 having a coverage area 112, a plurality of user equipments (UEs) 120, 121, and a backhaul network 130. As shown, the base station 110 establishes uplink (dashed line) or downlink (solid line) connections with the UEs 120, 121, which serve to carry wireless transmission from the UEs 120, 121 to the base station 110 and vice-versa. Wireless transmission over the uplink or downlink connections may include data communicated between the UEs 120, 121, as well as data communicated to or from a remote-end (not shown) by way of the backhaul network 130. As used herein, the term access node refers to any component (or collection of components) configured to provide wireless access to a network, such as base station, next generation base station (gNB), an E-UTRAN base station (eNB), a macro-cell, a femtocell, a Wi-Fi access point (AP), or other wirelessly enabled devices. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay/be, etc. As used herein, the term "UE" refers to any component (or collection of components) capable of establishing a wireless connection with a base station, such as a mobile device, a mobile station (STA), an IoT device (e.g., a smart sensor, etc.), subscribers, stations, and other wirelessly enabled devices. In some example embodiments, the network 100 may comprise various other wireless devices, such as relays, low power nodes, etc.

When the direct or line of sight (LOS) path between a transmitter and a receiver is blocked, the propagation between transmitter and receiver is possible through a non-line of sight (NLOS) path. In other words the signal propagation is through the reflections and diffractions.

Figure 2A:
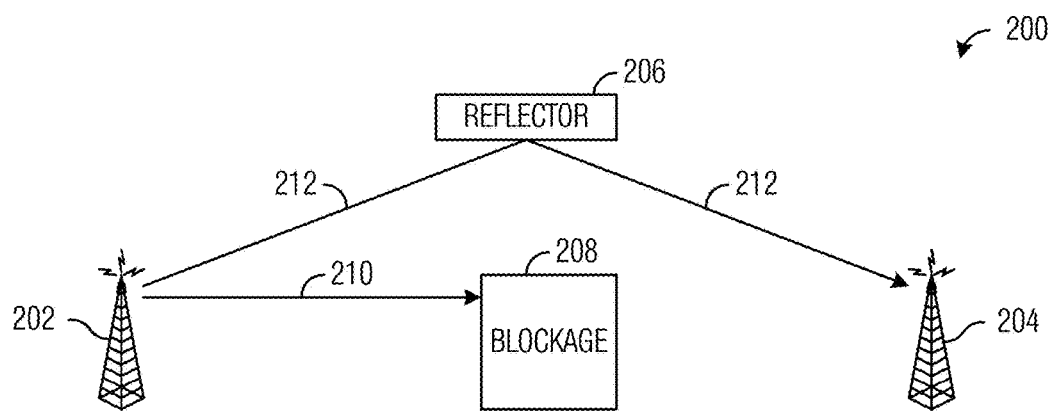
FIG. 2A illustrates an example a communication system in the case of which the propagation between transmitter and receiver is as NLOS propagation.

FIG. 2A illustrates an example a communication system 200 in the case of which the propagation between transmitter 202 and receiver 204 is as NLOS propagation. Communication system 200 that may be used for implementing the devices and methods disclosed herein. The system 200 may implement one or more channel access methods, including, but not limited to, methods such as code division multiple access (CDMA), time division multiple access (TDMA), frequency division multiple access (FDMA), orthogonal FDMA (OFDMA), or single-carrier FDMA (SC-FDMA).

In this example, the communication system 200 includes a transmitter 202 and a receiver 204. While certain numbers of these components or elements are shown in FIG. 2A, any number of these components or elements may be included in the system 200. In FIG. 2A, both the transmitter 202 and the receiver 204 may transmit and receive electromagnetic waves under multiple polarizations. And the transmitter 202 and the receiver 204 may be any entity capable of sending and receiving, including a base station, a mobile terminal, an access point, a wireless local area network (WLAN) station, etc.

The transmitter 202 may transmit repeatedly a same bit sequence carried in electromagnetic waves with different polarizations (for instance vertical polarization, horizontal polarization, and 45 degrees polarization) to the receiver 204. The receiver 204 may receive the signal transmitted by the transmitter 202. For multi-path propagation, each path corresponds to one copy of the same transmission (which means each path corresponds to at least one reflection), such as the copies of 210 and 212 in FIG. 2A. In the case of the propagation between the transmitter 202 and the receiver 204 being characterized as NLOS propagation (or NLOS beam, NLOS ray, etc.), a blockage 208 is located between the transmitter 202 and the receiver 204. The signal copy will not pass the blockage 208, such as the signal copy 210 being blocked by the blockage 208. A reflector 206 may also be included between the transmitter 202 and the receiver 204. The signal copy, such as the signal copy 212 may be reflected by the reflector 206, and then continue to the receiver 204. The blockage 208 may block the signal sent to the receiver 204. In this example, for each transmission, the receiver 204 receives one or more copies of the same signal that propagates on different paths, with none of them corresponding to an unobstructed (direct or LOS) path. Therefore, the communication between the transmitter 202 and receiver 204 is NLOS communication.

Figure 2B:
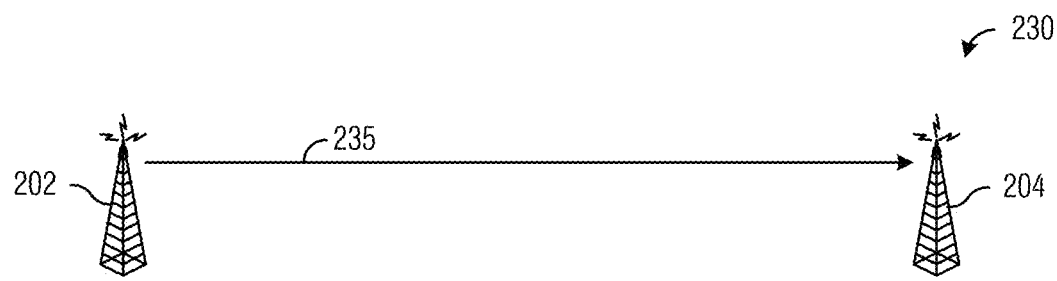
FIG. 2B illustrates an example a communication system in the case of which the propagation between transmitter and receiver is characterized as the LOS propagation (or NLOS beam, NLOS ray, NLOS path, etc.) that may be used for implementing the devices and methods disclosed herein.

FIG. 2B illustrates an example a communication system 230 in the case of which the propagation between transmitter 202 and receiver 204 is characterized as the LOS propagation (or NLOS beam, NLOS ray, etc.) that may be used for implementing the devices and methods disclosed herein. In this case, no blockage is located between the transmitter 202 and the receiver 204, and there is an unobstructed direct path 230 between the transmitter 202 and the receiver 204 allowing for the signal on path 230 to be unobstructed. Therefore, the communication between the transmitter 202 and receiver 204 is LOS communication.

The transmitter 202 in the disclosure is a device, such as an access node, a base station, a mobile terminal, an access point, a WLAN station, a UE, and so on, which transmits signals to the receiver 204 in certain examples. And the receiver 204 in the disclosure is a device, such as an access node, a base station, a mobile terminal, an access point, a WLAN station, a UE, and so on, which receives signals from the transmitter 202 in certain examples. In any example, the function of transmitter 202 and function of receiver 204 may be exchanged.

Figure 3A:
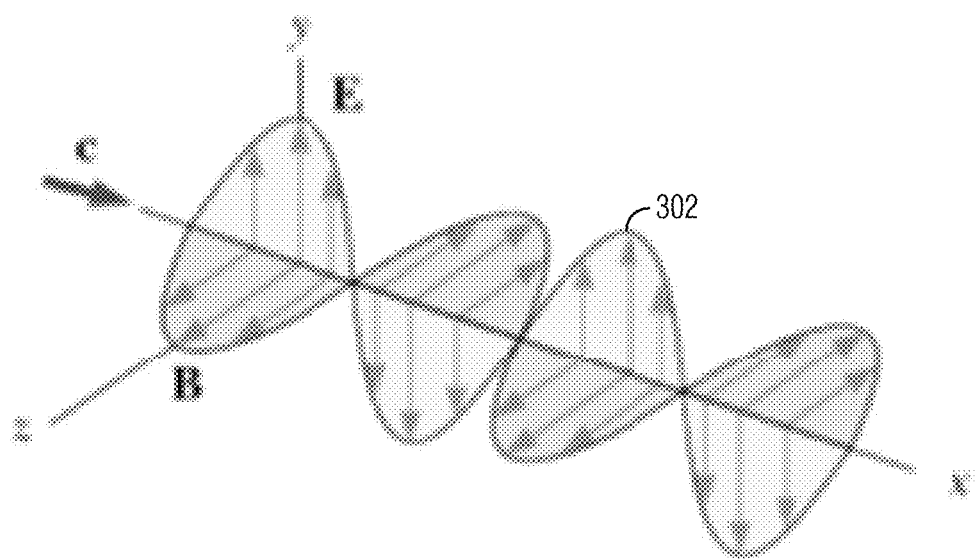
FIG. 3A illustrates an example of an electromagnetic wave that is linearly polarized.

FIG. 3A illustrates an example of an electromagnetic wave 302 that is linearly polarized. In this example, a signal wave, such as the electromagnetic wave 202, is linear polarized (for example in "y" direction of FIG. 3A) if the electric field E vector oscillates in a single fixed plane, in the "y" direction in this example. In FIG. 3A, "E" represents the vector of electric intensity of the signal wave, "B" represents the vector of magnetic intensity of the signal wave, and "c" represents the speed of propagation of the electromagnetic wave. The signal wave in the FIG. 3A is linearly polarized because "E" oscillates only in the plane (x-y), and signal wave (such as an electromagnetic wave) is the combination of the two vectors oscillations (such as the magnetic intensity B and the electric intensity E).

Figure 3B:
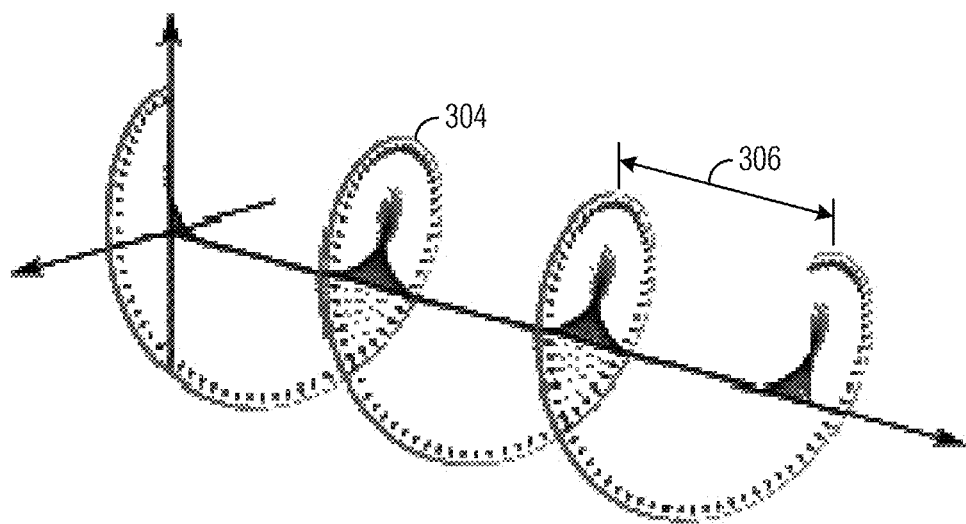
FIG. 3B illustrates an example of an electromagnetic wave that is circular polarized.

FIG. 3B illustrates an example of an electromagnetic wave 304 that is circular polarized. In FIG. 3B, the electric intensity vector of electromagnetic wave 304 is rotates 360 degrees during a period (e.g., period 306), which is the minimum time interval for a 360 degree rotation.

Figures 3C, 3D:
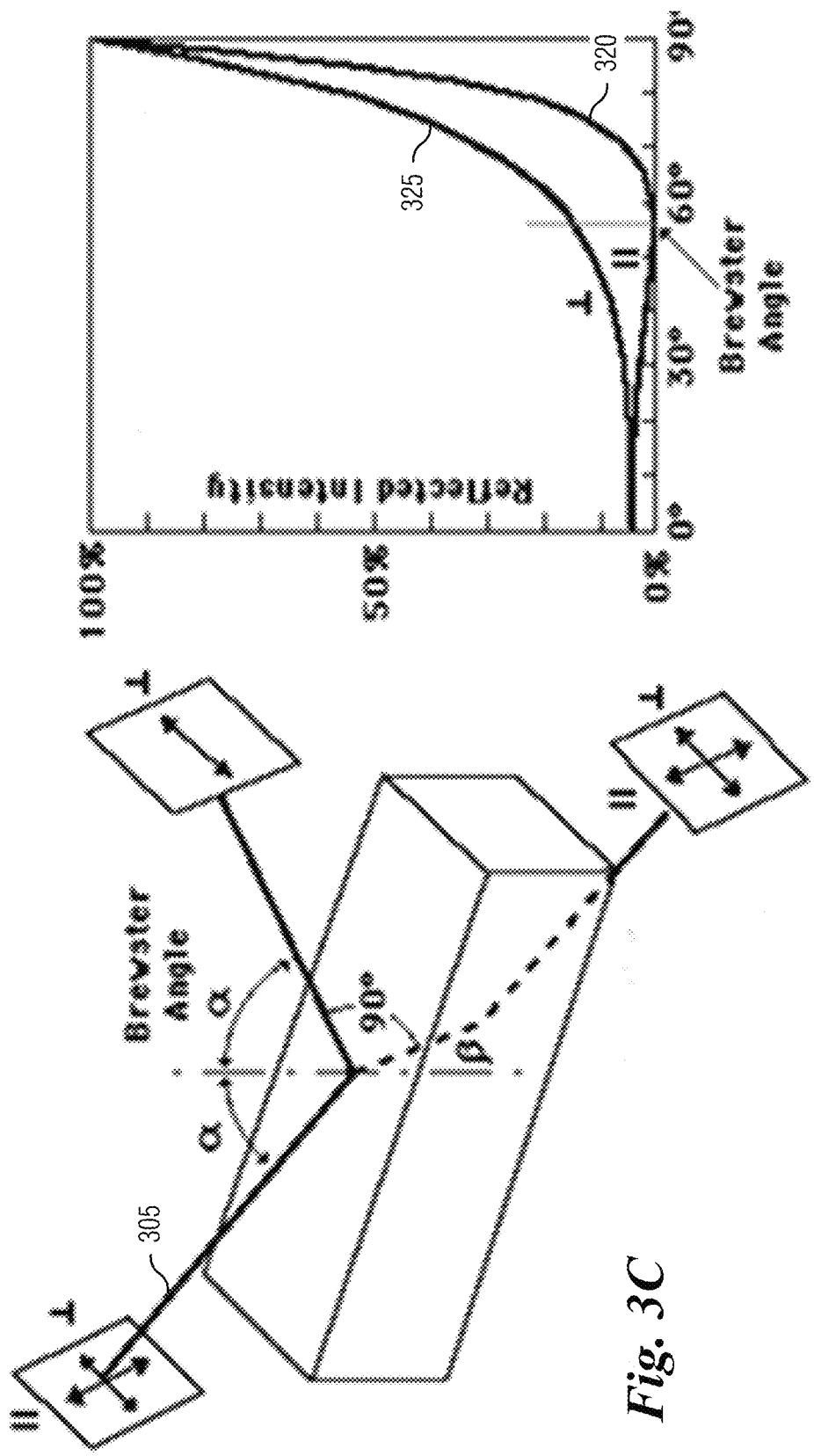
FIGS. 3C and 3D illustrate examples of an electromagnetic wave 305 during a reflection.

FIGS. 3C and 3D illustrate examples of an electromagnetic wave 305 during a reflection. Electromagnetic wave 305 is polarized. When reflected, a polarized wave (e.g., electromagnetic wave 305) undergoes a change in polarization, while a polarized wave that is not reflected will not undergo such changes. As shown in FIG. 3C, a reflection coefficient for light which has electric field parallel to a plane of incidence goes to zero at angle between 0° and 90°. The reflected light at that angle is linearly polarized, with its electric field vectors perpendicular to the plane of incidence and parallel to the plane of the surface from which it is reflecting. The angle at which this occurs is referred to as the polarizing angle or the Brewster angle. At other angles, the reflected light is partially polarized.

From Fresnel's equations, it can be determined that the parallel reflection coefficient 320 is zero when the sum of the incident and transmitted angles is equal to 90°. The application of Snell's law yields an expression for the Brewster angle. FIG. 3C illustrates an example where the reflection coefficients are different for waves parallel and perpendicular to the plane of incidence. FIG. 3C further illustrates that when light is incident at the Brewster angle, the reflected light is linearly polarized because the reflection for the parallel component is 0. FIG. 3D illustrates the reflected intensity for rays parallel (parallel reflection coefficient 320) and perpendicular (perpendicular reflection coefficient 325) to the plane of incidence.

In the following description the transmitter and the receiver denotes devices that may transmit and receive electromagnetic waves with multiple polarizations. Examples of such transmitters and receivers are base stations, mobile user devices, access points, WLAN stations, UEs, etc. One example embodiment of proposed solution consists of following basic procedure: (1) the transmitter and the receiver acknowledge each other that they support the feature of LOS determination. For instance they could exchange messages, or perform a broadcast of messages that contain a field indicating the support for the feature; (2) the receiver requests the transmitter to start the procedure of LOS determination. In this request the receiver might indicate the number of transmissions, and the polarizations; (3) the transmitter sends successively (repetitions) during a single transmission or in separate transmissions, the same sequence of bits at different polarization. For instance, in the case when there is a single transmission, the data transmitted consist of multiple repetitions of the same bit sequence, with each repetition at different polarization. When there are multiple transmissions, each transmission is sent at a different polarization. In one example embodiment the transmitter indicates in the preamble of its transmission, the number of repetitions and the polarizations corresponding to each repetition; (4) the receiver selects the first received path corresponding to each repetition and compares if they have the same intensity; (5) if the intensity of first received path of each received repetition is invariant to the transmitted polarization the receiver concludes that the communication was LOS; (6) the receiver might inform the transmitter that the communication is LOS.

In a different example embodiment the transmitter may broadcast an indication of the LOS feature support, and then indicates the number of repetitions and the corresponding polarization for each repetition followed by a broadcast of bit sequence repetitions at different polarizations. The receivers could then compare the intensity of the first received path at different polarization to determine if the communication is LOS. Transmission polarization could be achieved in different ways such as two dipole antennas oriented orthogonally to each other, with one parallel with the surface of earth and one perpendicular.

In this example, one transceiver transmits the same wave or the same bit sequence at least twice under different polarizations (e.g., the bit sequences have orthogonal polarizations) and another transceiver receives these transmissions and determine the intensity for each of the received wave or each of the received bit sequence repetitions. If the two received waves (or bit sequences) have the same intensity the transceiver concludes that the propagation of the received waves are LOS. In some example embodiments, the transmission of the bit sequence repetitions is sequentially in time (i.e., one after other). In some instances, repetitions are performed at approximately the same power, or at powers (known at the receiver) such that the receiver may compare the received intensity (power) of each transmission to determine if they underwent any reflection.

A multipath channel of communication is a channel where for each transmission from the transmitter, the receiver receives multiple copies of the transmission because the propagation between the transmitter and the receiver occurs via simultaneous paths. In the real world, each path corresponds to one or multiple reflections of the electromagnetic wave. Therefore, in the case of multipath channel propagation, for each transmission from the transmitter, the receiver might receive multiple copies of the same wave or bit sequence (due to the reflections in the environment). In many instances, with the LOS communication there is a single path (the shortest path) corresponding to the LOS, and multiple additional paths corresponding to the reflections. However if the communication is NLOS, all of the paths correspond to reflections (even the shortest) and there is no LOS path. Therefore in the proposed solution, the receiver has to observe (only, at least) the intensity of the first received path (corresponding to the transmission with the shortest ToF) for each of polarization. The receiver retains the intensity of the first received path (a copy) from the transmissions with different polarizations. If the first received path intensity is invariant for the transmitted polarizations, i.e., the first received path for each different polarization has the same intensity for different transmitter polarizations, the transmitter and the receiver are in LOS. Paths may also be referred to as rays.

In the above method, it is possible that if only one repetition of the bit sequence (two copies total, including the original transmission of the bit sequence) are transmitted, a corner case (a very unlikely event) might occur when there is no LOS (NLOS) but under multiple reflections, two transmitted bit sequences with different polarizations are still received with the same intensity. Such a case occurs when the reflectors are orthogonal with respect to each other, such as, when each reflector is at 45 degrees to each incident wave.

To deal with this particular case in the proposed solution, the transmitter sends several repetitions of the same bit sequence under different polarizations (e.g., more than two, so there are at least three transmissions) and the receiver determines the received intensity of the first received path (ray) of each transmission. If these intensities are the same it implies that the received waves were LOS, i.e., the transmissions did not suffer reflections.

Figure 4A:
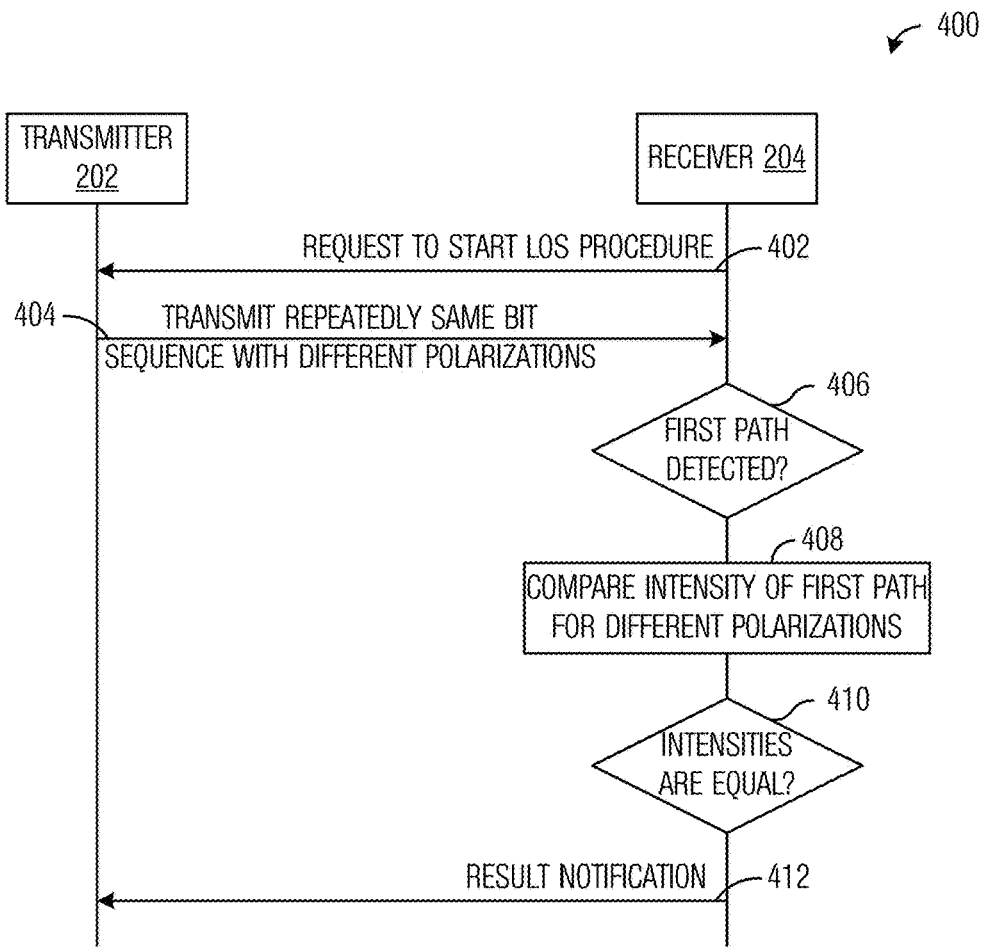
FIG. 4A illustrate example of a signal flow diagram of a first example embodiment of method for determining LOS according to example embodiments presented herein.

FIG. 4A illustrate example of a signal flow diagram 400 of a first example embodiment of method for determining LOS, according to the disclosure. The method may be performed in the context of the system as illustrated in FIG. 2A or in FIG. 2B, and may use the linear polarized or the circular polarized as an example as illustrated in FIG. 3A or 3B.

In step 402, the receiver 204 requests the transmitter 202 to start the procedure of LOS determination via sending a LOS determination request to the transmitter 202. The LOS determination request may include one or more of a number of transmissions to the receiver 204, and a number of polarizations available at the receiver 204. The number of transmissions to the receiver 204, and the number and the directions of polarizations of the receiver 204 may also be pre-established via a known definition of the protocol or standard.

In step 404 the transmitter 202 sends successively, during a single frame transmission or in separate frames transmissions, the same sequence of bits in wave signals with different polarizations. It is understood that the transmission could be in response to a prior request (such as the request in step 402) sent by the receiver 204 to the transmitter 202. Such prior request (such as the request in step 402) may contain the number and the directions of polarizations to be sent by the transmitter 202. The transmission at different polarizations could be achieved in different ways, such as two dipole antennas oriented orthogonally to each other, for example.

For a single frame transmission, the data transmitted by the transmitter 202 comprises multiple repetitions (or copies) of the same sequence of bits, with each repetition corresponding to one polarization of the different polarizations. The number of repetitions may be referred to as the number of polarizations in the LOS determination request, or may be referred to as a predefined number agreed between the receiver 204 and the transmitter 202. For multiple frame transmissions, each frame transmission is sent at different polarization. In one example embodiment, the transmitter 204 indicates, for instance in the preamble of its transmission (first part of the transmission), the number of bit sequence repetitions and the polarizations corresponding to each bit sequence repetition that will follow in the transmission.

It is further understood that in some example embodiments of step 404, the transmitter 202 transmits the same signal wave or the same bit sequence at least twice with different polarizations at the same power and to same direction (the same orientation).

The number of times the same signal wave or the same sequence bit is sent may be referred to as the number of transmissions. The number of transmission in LOS determination request may specify the number of times the same signal wave or the same sequence bit is sent.

In step 406, the receiver 204 checks to determine if the first received copy from each of the plurality of polarizations has been detected and measures the power or intensity thereof.

In the example of NLOS multi-path channel propagation, each path corresponds to one copy (also referred to as one reflection) of the transmitted signal wave. The receiver 204 receives multiple copies for each transmission because the propagation between the transmitter 202 and the receiver 204 occurs through multiple paths. In some examples, each path corresponds to one or multiple reflections of the electromagnetic wave. Therefore, in the case of multipath channel propagation, for each transmission from the transmitter 202, the receiver 204 may receive multiple copies of the transmission (due to the reflections in the environment). For the LOS communication, the first received path (which is also the shortest path) corresponds to the LOS communication, while the other multiple adjacent paths correspond to the reflections.

After the receiver 204 measures (or detects) the first received path (through the received signal) for each transmission, the receiver 204 obtains and compares the intensity of each first received copy for the plurality of transmissions, where the first received copy is the received copy via the first received path.

For example, the transmitter 202 sends the same bit sequence for two times, each time with two polarizations. The two times corresponds to two transmissions. The first transmission of the same bit sequence with two polarizations (polarization A and polarization B, for example), and the second transmission of the same bit sequence with two polarizations (polarization C and polarization D, for example). The receiver 204 may detect a first path for the first transmission over a path of the polarization A and a path of the polarization B. The receiver 204 may detect a first path for the second transmission over a path of the polarization C and a path of the polarization D. As an example, the first path for the first transmission is the path of the polarization A, and the first path for the second transmission is the path of the polarization C.

In steps 408 and 410, the receiver 204 determines whether the intensities (or the powers) of each first received copy are equal. If the intensities (or the power) of each first received copy of the plurality of transmissions for each polarization are equal (or less than a threshold value), the transmission between the receiver 204 and the transmitter 202 may be LOS, and otherwise the transmission between the receiver 204 and the transmitter 202 is NLOS.

For example, referencing the example presented above, the receiver 204 determines whether the intensities of the polarization A and the polarization C are equal, and characterizes the path in accordance therewith.

For the signal wave transmitted with circular polarization case (such as the example represented in FIG. 3B), the received wave signal has the same intensity during a complete rotation of the vector "E" for LOS waves. While for NLOS reflections, there is a variation of the intensity depending on the particular reflection (orientation of the reflection surface). Therefore for the circular polarization transmission, the receiver 202 will compare the intensity variation of the received wave signal and if there is (or approximately) constant intensity in the received wave the propagation, the communication between the transmitter 202 and the receiver 204 may be LOS communication. To reduce the likelihood for a LOS determination error, the technique may be combined with a successive receive or transmit beamforming as described below.

In step 412, the receiver 204 notifies the determination result to the transmitter 202.

In this example, the receiver 204 characterizes the path, i.e., determines whether the communication between the receiver 204 and the transmitter 202 on the path is LOS, in accordance with the intensities of each copy of the wave signal. Procedures which will use the result (the characterization of the path), such as procedures determining a distance between the receiver 204 and the transmitter 202, can have greater confidence in the distances determined using the ToF.

In an example embodiment, when the communication between the receiver 204 and the transmitter 202 changes from LOS to NLOS (e.g., the path characterization changes from LOS to NLOS), the device (which may be the receiver 204 or the transmitter 202) may decide to initiate a handover (to start new communication) to a different device or access point (e.g., an access node), so that the device can perform LOS communication. In other words, the device initiates a handover to a different device to avoid NLOS communication. For this purpose, the device (which may be the receiver 204 or the transmitter 202) will periodically assess if there are neighboring devices (e.g., access nodes) that could communicate with it in LOS to switch over to if the current LOS communication fails or become NLOS. This LOS based handover can be used, for example, to obtain a higher quality of communication (reduced pathloss), or to allow a precise tracking of the location of the device.

The LOS determination could also allow the remote operation of the device (which may be the receiver 204 or the transmitter 202), for instance a drone, to determine a change of trajectory to maintain the LOS communication.

In an example embodiment, detection of LOS can be performed simultaneously with multiple receivers. For instance the transmitter 202 sends the same wave signal at different polarizations to multiple receivers and then requests each receiver to report whether the communications between the receivers and the transmitter 202 are LOS communication. Alternatively, the transmitter 202 sends the same wave signal at different polarizations and then allows the LOS receiver to compete for channel access via a random access channel procedure. In other words, the receivers that determine that they are utilizing LOS communications initiate random access channel procedures to content for channel access.

In a different example embodiment, the devices record the path characterization information as a function of location (e.g., the channel at this location is NLOS or LOS) and use the stored information for accessing or discovery of an access node, performing an access node discovery, or for fast beamforming. As an example, in order to minimize the discovery delay, the beamforming scanning could start with the device scanning the LOS directions (as determined from the stored information) and then the device performs additional search around the LOS directions if the LOS direction becomes obstructed. In other words, the device performs fast beam forming by initially scanning the LOS directions, then if a suitable beam is not found, the device scans in directions around the LOS direction, where the LOS directions are retrieved from the stored information.

Figure 4B:
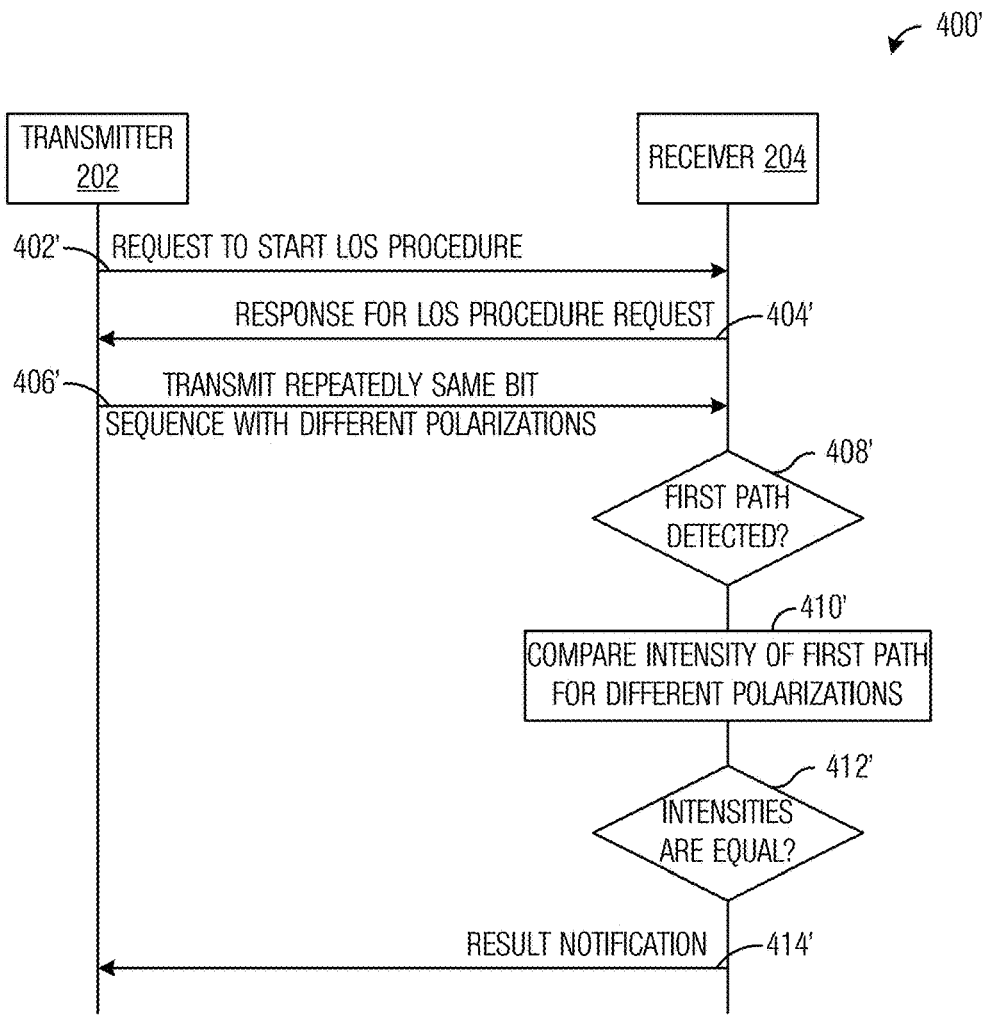
FIG. 4B illustrate example of an alternate signal flow diagram of a first example embodiment of method for determining LOS according to example embodiments presented herein.

FIG. 4B illustrate example of an alternate signal flow diagram 400' of a first example embodiment of method for determining LOS, according to the disclosure. The method may be performed in the context of the system as illustrated in FIG. 2A or in FIG. 2B, and may use the linear polarized or the circular polarized as an example as illustrated in FIG. 3A or 3B.

In FIG. 4B, it is the transmitter 202 initiates the request to start LOS procedure. That is, the transmitter 202 sends the LOS determination request to the receiver 204. And the LOS determination request in step 402' comprises one or more of a number of transmissions of the transmitter 202, and a number of polarizations of the transmitter 202. And then in step 404', the receiver 204 sends a response to the transmitter 202. The response in step 404' may comprise the indication of confirmation starting the LOS procedure. Alternatively, the response in step 404' may comprise one or more of a number of transmissions of the receiver 204, and a number of polarizations of the receiver 204.

The remaining steps of FIG. 4B (steps from 406' to 414') correspond to the steps from 404 to 412 in FIG. 4A, and will not be discussed herein.

Figure 4C:
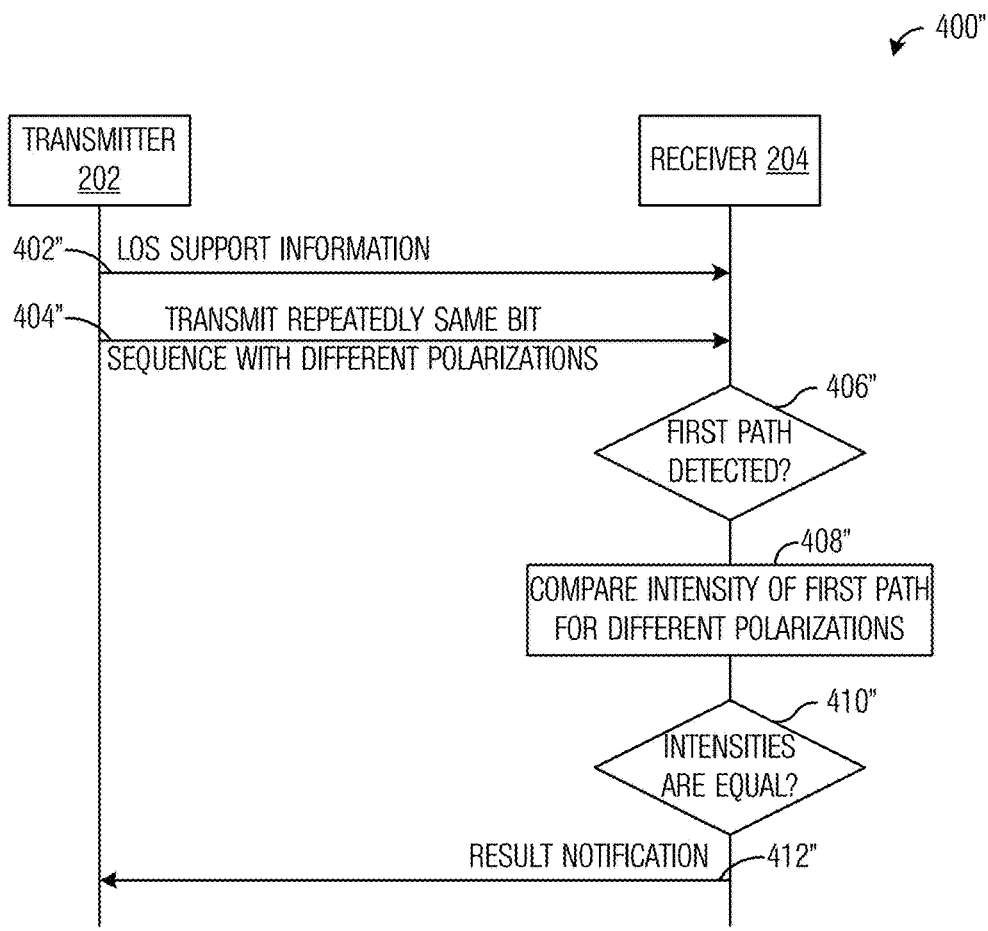
FIG. 4C illustrate example of another alternate signal flow diagram of a first example embodiment of method for determining LOS according to example embodiments presented herein.

FIG. 4C illustrate example of another alternate signal flow diagram 400" of a first example embodiment of method for determining LOS, according to the disclosure. The method may be performed in the context of the system as illustrated in FIG. 2A or in FIG. 2B, and may use the linear polarized or the circular polarized as an example as illustrated in FIG. 3A or 3B.

In FIG. 4C, it is the transmitter 202 initiates the request to start LOS procedure. That is, the transmitter 202 broadcasts the LOS determination request to receivers, such as the receiver 204. The LOS determination request in step 402" comprises one or more of the number of transmissions of the transmitter 202, and a number of polarizations of the transmitter 202. The transmitter 202 broadcasts, in a single transmission or in separate transmissions, a wave signal comprising the same bit sequence with different polarization.

The remaining steps of FIG. 4C (steps from 406" to 412") are the same as the steps from 406 to 412 in FIG. 4A, and will not be discussed herein.

Prior the step 402, 402', and 402", the receiver 204 may send a LOS determining request to the transmitter 202, and the transmitter 202 and the receiver 204 may perform a confirmation procedure to confirm both the transmitter 202 and the receiver 204 support the procedure of LOS determination. The confirmation procedure may be performed by exchanging messages between the receiver 204 and the transmitter 202, or broadcasting messages by the transmitter 202 and the receiver 204.

The message indicating the receiver 204 or the transmitter 202 supports the LOS determination may be an enhanced directional multi-gigabit (EDMG) beam refinement protocol (BRP) request, and the EDMG BRP request comprises an element indication indicating that the device (which may be the receiver 204 or the transmitter 202 in this example) sending the EDMG BRP request supports LOS determination.

As an example, the EDMG BRP request may follow the format shown in Table 1.

TABLE 1

First example EDMG BRP request format

| B0-B7 Element ID | B8-B15 Length | B16-B23 Element ID Extension | B24-B31 L-RX | B32-B39 L-TX-RX | B40-B50 TX Sector ID | B51-B52 Sector ID | B53-B56 EDMG TRN-Unit P | B57-B58 EDMG TRN-Unit N |
|---|---|---|---|---|---|---|---|---|
| Bits: 8 | 8 | 8 | 8 | 8 | 11 | 2 | 4 | 2 |

| B59 TXSS-REQ | B60 TXSS-REQ-RECIPROCAL | B61-B69 TXSS-SECTORS | B70-75 BRP CDOWN | B76-B83 TX Antenna Mask | B84 First Path Training | B85 LOS Training | B86-B87 |
|---|---|---|---|---|---|---|---|
| Bits: 1 | 1 | 9 | 6 | 8 | 1 | 1 | 3 |

Where, the first path training element indicates that the device (which may be the receiver 204 or the transmitter 202 in this example) sending EDMG BRP request supports the first path training procedure. Which means that the device supports the determining of which path is the shortest path among all the path conveying the different copies of the same bit sequence, where each copy correspond to one polarization.

The LOS training element indicates that the first device (which may be the receiver 204 or the transmitter 202) sending the EDMG BRP request supports LOS determination procedure, such as those presented in FIGS. 4A-4C and attendant discussion.

In another example embodiment, the first path training element may be included in the header of the EDMG BRP request. Alternatively, the first path training element may be included in a text string, which is part of the EDMG BRP request, for example.

As another example, the EDMG BRP request may follow the format shown in Table 2:

The First Path Training element when set to a second value, e.g., '0', indicates that the TRN field appended to this packet should be used for best performance beamforming training.

The LOS training element when set to a first value, e.g., '1', indicates that the TRN field appended to this packet should be used for LOS beamforming training. When the LOS training element is set to a second value, e.g., '0', indicates that the TRN field appended to this packet is not used for the LOS beamforming.

In the EDMG BRP request, if the first device sending the EDMG BRP request supports the LOS determination procedure, both the first path training element and the LOS training element should be set to a first value, e.g., '1'. Else, the first device sending the EDMG BRP request does not support the LOS determination procedure.

After a second device (which may be the transmitter 202 or the receiver 204 in this example) receives the EDMG BRP request, the second device may send a response to the first device (which sent the EDMG BRP request) to indicate

TABLE 2

Second example EDMG BRP request format.

| B1 Initiator | B2-B9 L-RX | B10 TX-FBCK-REQ | B11 TX-Train-Response | B12 RX-Train-Response | B13 TX-TRN-OK | B14 TXSS-FBCK-REQ |
|---|---|---|---|---|---|---|
| bits: 1 | 8 | 1 | 1 | 1 | 1 | 1 |

| B15-B26 TX sector ID | B27-B28 Best Sector FB | B39-B41 Best FBCK Antenna Id | B42 MID Extension | B43 BRP-TXSS-OK | B44-B48 L-RX-TX | B49-B50 TRN-UP | B51-B54 TRN-UM |
|---|---|---|---|---|---|---|---|
| bits: 12 | 12 | 3 | 1 | 1 | 5 | 2 | 4 |

| B55-B56 TRN-UN | B57 TXSS-REQ | B58 TXSS-REQ-RECIPROCAL | B59-B67 TXSS-SECTORS | B68-B73 BRP CDOWN | B74-B81 TX Antenna Mask | B82 First Path Training |
|---|---|---|---|---|---|---|
| bits: 2 | 1 | 1 | 9 | 6 | 8 | 1 |

| B83 LOS Training | B84 B88 Reserved |
|---|---|
| bits: 1 | 5 |

If the receiver 204 and transmitter 202 confirm that both the transmitter 202 and the receiver 204 support a procedure of LOS determination, through the EDMG BRP request, for example, the packet comprises an indication indicating that the copy should be used for first path beamforming training. Where, the First Path Training element when set to a first value, e.g., '1', indicates that the TRN field appended to this packet should be used for first path beamforming training.

that the second device supports the LOS determination procedure. The second device may also send the EDMG BRP request to the first device to indicate that the second device also supports the LOS determination procedure.

Any response from the second device or the EDMG BRP request from the second device may comprise an indication indicating that the device (the first device or the second device) supports the LOS determination procedure.

In other example, if the receiver 204 and transmitter 202 confirm that both the transmitter 202 and the receiver 204 support the Dual polarization TRN procedure via the message, the packet comprises an indication to use the First Path beamforming training. Where, the First Path Training element set to a first value, e.g., '1', indicates that the TRN field appended to this packet should be used for First Path beamforming training. The First Path Training element may be set to a second value, e.g., '0', to indicate that the TRN field appended to this packet should be used for best performance beamforming training.

The LOS training element set to a first value, e.g., '1', indicates that the TRN field appended to this packet should be used for LOS beamforming training. The LOS training element set to a second value, e.g., '0', indicates that the TRN field appended to this packet is not used for the LOS BF.

In the EDMG BRP request, if the first device sending the EDMG BRP request supports the LOS determination procedure, both the first path training element and the LOS training element should be set to a first value, e.g., '1'. Else the first device sending the EDMG BRP request does not support the LOS determination procedure.

After a second device (which may be the transmitter 202 or the receiver 204 in this example) receiving the EDMG BRP request, the second device may send a response to the first device (which sent the EDMG BRP request) to indicate that the second device supports the LOS determination procedure. The second device may also send the EDMG BRP request to the device to indicate that the second device also support the LOS determination procedure.

Any of the response from the second device or the EDMG BRP request from the second device may comprise an indication indicating the peer device of the LOS determination procedure.

Figure 5:
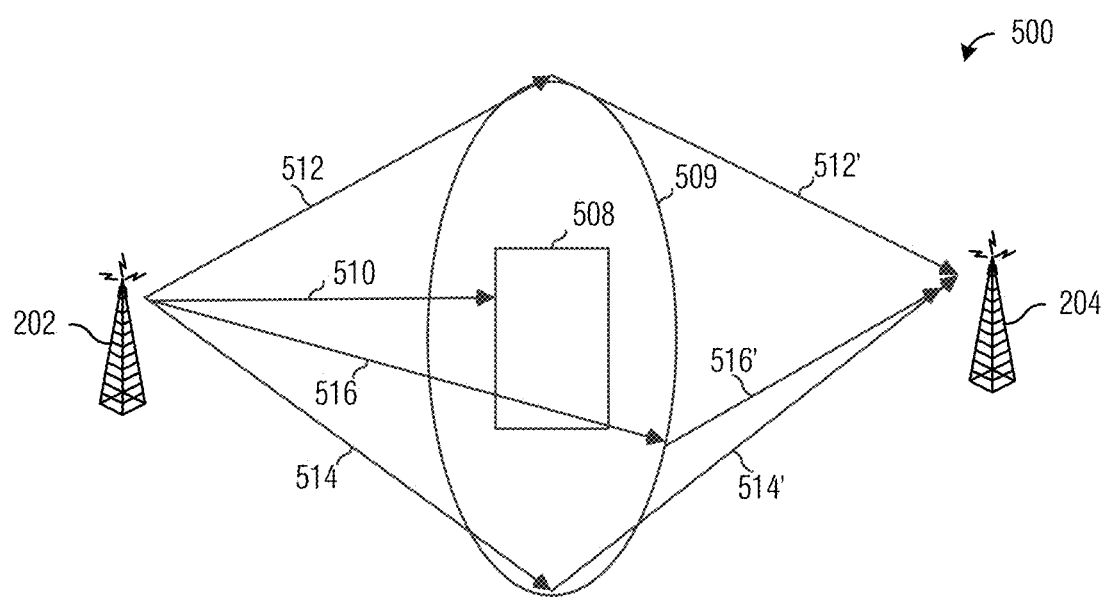
FIG. 5 illustrate example of a communication system in the case of which the propagation between transmitter and receiver is NLOS with a cylindrical reflection surface that obstructs LOS communication (e.g., beam) with a cylindrical reflection region according to example embodiments presented herein.

FIG. 5 illustrate example of a communication system 500 in the case of which the propagation between transmitter 202 and receiver 204 is NLOS with a cylindrical reflection surface 508 that obstructs LOS communication (e.g., beam 510) with a cylindrical reflection region 509, the communication system 500 that may be used for implementing the devices and methods disclosed herein.

That is each repetition (copy) at any polarization will suffer similar reflection, hence, at the receiver 204, the first received copies for each transmission (e.g., beams 512, 512', 514, 514', 516, and 516') will have about the same intensity no matter the polarization at the transmitter 202. If the transmission by the transmitter 202 and the reception by the receiver 204 is omni-directional, the receiver 204 will always receive the same wave signal independent of the polarization at the transmitter 202 due to the symmetry of this construction (cylindrical reflection surface 508).

However if the receiver 204 performs beamforming receiving (if the receiver 204 receives from limited spatial directions (for instance a 3D solid angle)), then the ToF will be the same, but the intensity of the first received ray (first received copy) will change with the polarization wave at the transmitter 202. The receiver 204 may then conclude that the propagation is NLOS.

Therefore, as an example embodiment of the disclosure, the receiver 204 may repeatedly perform beamformed receiving in different spatial directions (and therefore potentially suffering different reflections) while the transmitter 202 will change the polarizations of transmitted waves. If a spatial direction is found that it is invariant to the polarization, then that spatial direction will be considered LOS. In an alternative example embodiment, the transmitter 204 sends beamformed waves in different directions, with multiple (different) polarizations for each direction, while the receiver 204 observes the first received wave intensity with respect to polarization changes, then the communication is considered NLOS. The addition of beamformed transmission of different polarizations to the above described LOS procedures may be performed, for instance, after the path characterization is determined as an additional step to verify the path characterization. The beamformed transmission also may be performed during the LOS procedure itself, when polarizations and beamformed beams are combined to determine when and if the first received copy is invariant with respect to polarizations, which happens only in LOS communication.

An example of achieving beamforming involves the use of a phased array antenna, such as a two-dimensional (2D) polarized array of antennas where each antenna has a phase shifter. Another example uses a polarized horn antenna.

Figure 6A:
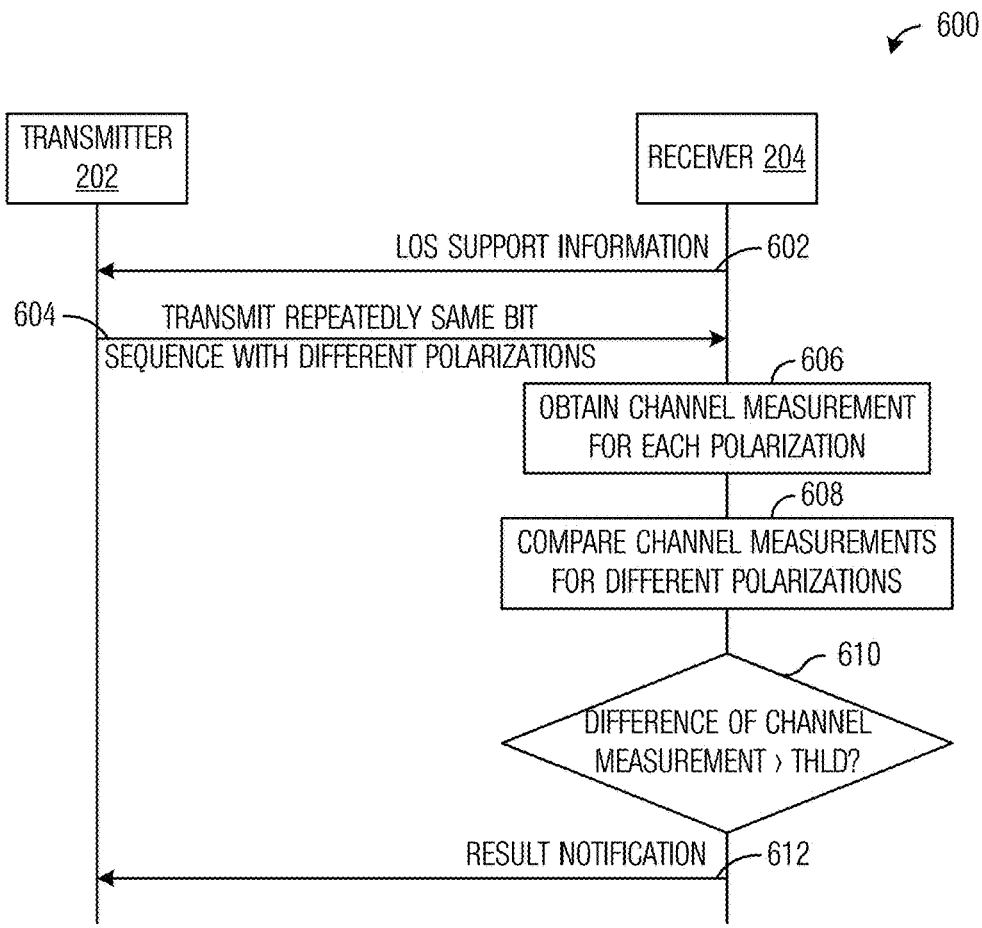
FIG. 6A illustrate example of a signal flow diagram of a second example embodiment of method for determining the LOS according to example embodiments presented herein.

FIG. 6A illustrate example of a signal flow diagram 600 of a second example embodiment of method for determining the LOS, according to the disclosure. The method may be carried out in the context of the system as illustrated in FIG. 2A or FIG. 2B, and may use the linear polarized or the circular polarized as an example as illustrated in FIG. 3A or 3B.

In step 602, the receiver 204 requests the transmitter 202 to start the LOS determination procedure by sending a LOS determining request to the transmitter 202. The LOS determining request may include an indication indicating whether a dual polarization procedure for LOS is used, the dual polarization means the number of different polarization for each direction is two. Same sequence is sent twice in the same direction with different polarizations, for instance two orthogonal polarizations.

If the indication indicates that the dual polarization procedure for LOS is used, the transmitter 102 should send a same sequence of bits in wave signals at two different polarizations. If the indication is that the dual polarization procedure for LOS is not used, the transmitter 202 sends the bit sequence in wave signals, but not with two polarizations. FIG. 6A presents an example in which the dual polarization procedure for LOS is used.

In step 604, the transmitter 202 sends the same bit sequence in wave signals at different polarizations. An example of such a bit sequence in IEEE 802.11ay is referred to as a training TRN sequence and is sent in a direction in space. The transmission may be in response to a prior LOS determining request comprising the indication indicating which dual polarization procedure for LOS is used. Transmission at different polarizations may be achieved in different ways, such as with two dipole antennas oriented orthogonally to each other, with one parallel with the surface of the Earth and one perpendicular to the surface of the Earth.

For a single frame transmission, the data transmitted by the transmitter 202 comprises multiple repetitions (copies) of the same bit sequence, with each repetition (copy) transmitted with a polarization out of the polarizations.

Before the transmitter 202 transmits the wave signal comprising the same bit sequence to the receiver 204, the transmitter 202 may notifies the TRN power for each of the polarizations. The transmitter 202 may transmit the same signal wave at the same power for the different polarizations, or the transmitter 202 may transmit the same signal wave at different powers for the different polarizations.

In step 606, the receiver 204 obtains a channel measurement for each polarization. Example channel measurements are presented in Table 3, which illustrates example I and Q component values with differing polarizations for various filter taps. The channel measurements obtained by the receiver 204, with the Channel Measurement for the First Path and Dual Polarization TRN enabled, may be shown to Table 3. As shown in Table 3, for each polarization, the channel measurements comprise a Relative I Component Tap #1 Polarization #1, and a Relative Q Component Tap #1 Polarization #1. The Relative I Component Tap #1 Polarization #1 is the in-phase component of impulse response for Tap #1 (corresponding to the shortest delay), and polarization #1 in Dual Polarization TRN. The Relative Q Component Tap #1 Polarization #1 is the in-quadrature component of impulse response for Tap #1 (corresponding to the shortest delay), and polarization #1 in the Dual Polarization TRN.

If the Dual Polarization TRN procedure is not combined with the First Path procedure, the receiver 204 may feedback to the transmitter 202 measurements for more than a single tap (first path), also illustrated in the Table 3.

In the example of Dual polarization TRN, the transmitter 202 sends the wave signal comprising the same bit sequence in two polarizations. Therefore, the receiver 204 obtains the Relative Q Component and the Relative I Component for each of the two polarizations. In other examples of Dual polarization TRN, the transmitter 202 sends the wave signal comprising the same bit sequence in two different polarizations via the multiple path channel, the receiver 204 obtains the Relative Q Component and the Relative I Component for each path of each of the two polarizations.

TABLE 3

Example channel for differing polarizations

| Field | Size | | Meaning |
|---|---|---|---|
| Dual Polarization TRN Measurement | Relative I Component Tap #1 Polarization #1 | 8 bits | The in-phase component of impulse response for Tap #1 (shortest delay), and polarization #1 in Dual Polarization TRN |
| | Relative Q Component Tap #1 Polarization #1 | 8 bits | The in-quadrature component of impulse response for Tap #1 (shortest delay), and polarization #1 in Dual Polarization TRN |
| | Relative I Component Tap #1 Polarization #2 | 8 bits | The in-phase component of impulse response for Tap #1 (shortest delay), and polarization #2 in Dual Polarization TRN |
| | Relative Q Component Tap #1 Polarization #2 | 8 bits | The in-quadrature component of impulse response for Tap #1 (shortest delay), and polarization #2 in Dual Polarization TRN |
| | Relative I Component Tap #2 Polarization #1 | 8 bits | The in-phase component of impulse response for Tap #2 ( ), and polarization #1 in Dual Polarization TRN |
| | Relative Q Component Tap #2 Polarization #1 | 8 bits | The in-quadrature component of impulse response for Tap #2 ( ), and polarization #1 in Dual Polarization TRN |
| | Relative I Component Tap #2 Polarization #2 | 8 bits | The in-phase component of impulse response for Tap #2 ( ), and polarization #2 in Dual Polarization TRN |
| | Relative Q Component Tap #2 Polarization #2 | 8 bits | The in-quadrature component of impulse response for Tap #2 ( ), and polarization #2 in Dual Polarization TRN |
| | . . . | | |
| | Relative I Component Tap #N Polarization #1 | 8 bits | The in-phase component of impulse response for Tap #n ( ), and polarization #1 in Dual Polarization TRN |
| | Relative Q Component Tap #N Polarization #1 | 8 bits | The in-quadrature component of impulse response for Tap #N ( ), and polarization #1 in Dual Polarization TRN |
| | Relative I Component Tap #N Polarization #2 | 8 bits | The in-phase component of impulse response for Tap #N (), and polarization #2 in Dual Polarization TRN |
| | Relative Q Component Tap #N Polarization #2 | 8 bits | The in-quadrature component of impulse response for Tap #N (, and polarization #N in Dual Polarization TRN |

As the example presented in Table 3, in the Dual polarization TRN, the transmitter 202 sends wave signal comprising the same bit sequence in two polarizations, and each polarization has N paths. The channel measurement for the N-th path in the two polarizations is also presented in Table 3. The Tap #1 represents the first path the receiver measured, and Tap #N represents the N-th path the receiver measured. The first path has the shortest delay.

In step 608, the receiver 204 compares the channel measurements for the two polarizations to obtain the channel measurement difference.

In step 610, the receiver 204 determines if the channel measurement difference between the two polarizations is larger than a threshold. If the channel measurement difference between the two polarizations is larger than the threshold, the receiver 204 may determine that the transmission between the receiver 204 and the transmitter 202 is NLOS, otherwise the transmission is LOS. The threshold may be specified in a technical standard, or by the operator of the communications system. The threshold may be determined through collaboration between the devices of the communications system.

If the transmitter 202 sends the same bit sequence in two polarizations, and each polarization has multiple paths, the receiver 204 may compare the channel measurement of the first path of each of the two polarizations. If the channel measurement difference between the two polarizations is larger than a threshold, the receiver 204 may determine that the transmission between the receiver 204 and the transmitter 202 is NLOS, otherwise the transmission may be LOS. The threshold is stored in the receiver 204. The threshold might be established beforehand or implementation specific. The threshold needs to be sufficiently large to filter out the possible noise and measurement errors. If the radiated power at the transmitter 202 for the two polarizations is different, the receiver 204 needs to consider this difference in addition to the threshold.

In step 612, the receiver 204 may notify the determination result to the transmitter 102.

In this example, the receivers 204 determines if the communication between the receiver 204 and the transmitter 202 is LOS based on the channel measurements for the two polarizations to ensure the determination result. So that the procedures that will utilize the result (the path characterization), such as those that determine a distance between the receiver 204 and the transmitter 202, can good certainty in the results.

In other example, the receiver 204 may not perform the steps 608 to 612. Instead, the receiver 204 sends the channel measurement for each polarization to the transmitter 202. The transmitter 202 receives the channel measurement for each polarization and compares the channel measurements for the two polarizations, and characterizes the path (e.g., determines whether the channel measurement difference for the two polarization is larger than a threshold) by performing its own version of steps 608 and 610. If the channel measurement difference for the two polarizations is larger than a threshold, the transmitter 202 may determine that the transmission between the receiver 204 and the transmitter 202 is NLOS, otherwise the transmission is LOS.

In an example embodiment, when the communication between the receiver 204 and the transmitter 202 changes from LOS to NLOS (e.g., the path characterization changes from LOS to NLOS), the device (which may be the receiver 204 or the transmitter 202 in this example) may decide to handover (start new communication) to a different device or access point (e.g., an access node), so that the device can perform LOS communication. In other words, the device initiates a handover to a different device to avoid NLOS communication. For this purpose, the device (which may be the receiver 204 or the transmitter 202) will periodically asses if there are neighboring devices (e.g., access nodes) that could communicate with it in LOS to switch over to if the current LOS communication fails or become NLOS. This LOS based handover can be used, for example, to obtain a higher quality of communication (reduced path loss), or to allow a precise tracking of the location of the device.

Figure 6B:
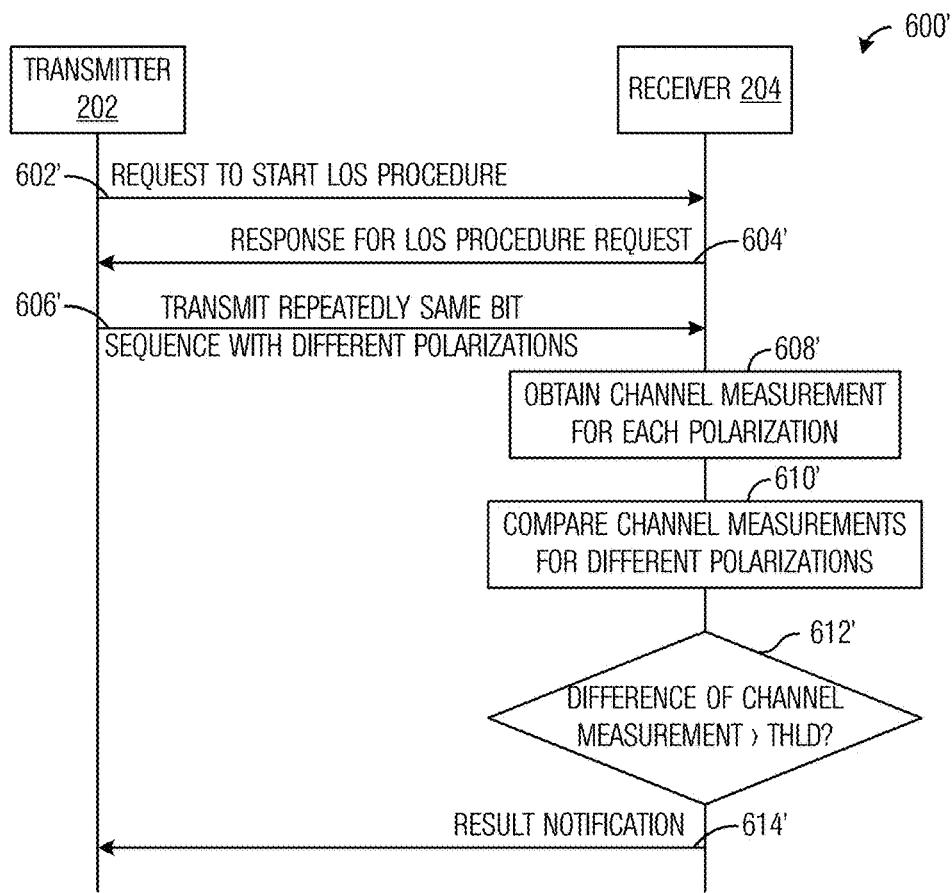
FIG. 6B illustrate example of an alternate signal flow diagram of a second example embodiment of method for determining LOS according to example embodiments presented herein.

FIG. 6B illustrate example of a signal flow diagram 600' of a second example embodiment of method for determining LOS, according to the disclosure. The method may be performed in the context of the system as illustrated in FIG. 2A or in FIG. 2B, and may use the linear polarized or the circular polarized as an example as illustrated in FIG. 3A or 3B.

In FIG. 6B, it is the transmitter 202 initiates the request to start LOS procedure. That is, the transmitter 202 sends a LOS determination request to the receiver 204. The LOS determination request in step 602' comprises the indication indicating if a dual polarization procedure for LOS is used. And then in step 604', the receiver 204 sends a response to the transmitter 202. The response in step 604' may comprise the indication indicating the initiating of the LOS procedure using the dual polarization procedure.

The steps from 606' to 614' in FIG. 6B as same as the steps from 604 to 612 in FIG. 6A, and will not be discussed herein.

Figure 7:
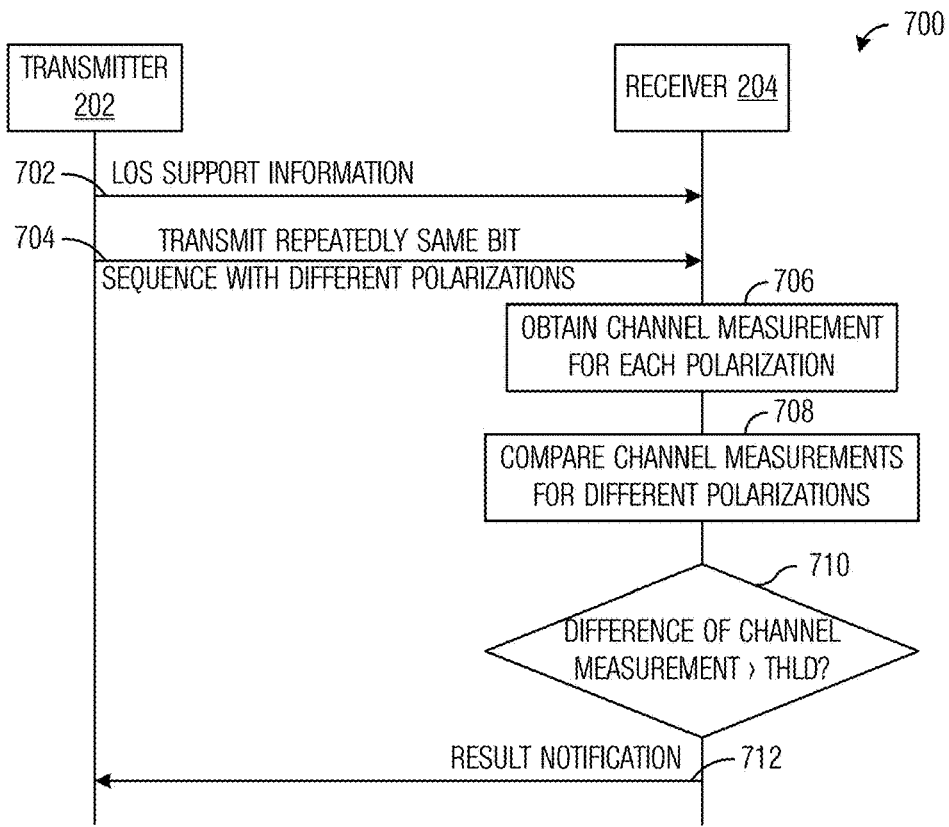
FIG. 7 illustrates an example of a signal flow diagram of a third example embodiment of method for determining LOS according to example embodiments presented herein.

FIG. 7 illustrates an example of a signal flow diagram 700 of a third example embodiment of method for determining LOS, according to the disclosure. The method may be performed in the context of the system as illustrated in FIG. 2A or in FIG. 2B, and may use the linear polarized or the circular polarized as an example as illustrated in FIG. 3A or 3B.

In FIG. 7, the transmitter 202 initiates the request to start LOS procedure, step 702. That is, the transmitter 202 broadcasts a LOS determination request to the receiver 204. The LOS determination request in step 702 comprises an indication indicating which the dual polarization procedure for LOS is used. The transmitter 202 then broadcasts, during a single transmission or in separate transmissions, the same bit sequence with different polarizations, step 704.

The steps from 706 to 712 in FIG. 7 are the same as the steps from 606 to 612 in FIG. 6A, and will not be discussed herein.

In other example, the receiver 204 may not perform the steps 608 to 612 in FIG. 6A, the steps 610' to 614' in FIG. 6B, or the steps 708 to 712 in FIG. 7. Instead, the receiver 204 sends the channel measurement for each polarization to the transmitter 202 after obtaining the channel measurements for each polarization. The transmitter 202 compares the channel measurements of the two polarizations, and characterizes the path (e.g., determines whether the channel measurement difference between the two polarizations is larger than a threshold) by performing its own version of the corresponding steps. If the channel measurement difference between the two polarizations is larger than a threshold, the transmitter 202 may determine that the transmission between the receiver 204 and the transmitter 202 is NLOS, otherwise the transmission is LOS.

Prior to the step 702, the receiver 204 may send a Dual Polarization request to the transmitter 202, the transmitter 202 and the receiver 204 may perform a confirmation procedure to confirm both of the transmitter 202 and the receiver 204 support a procedure of Dual Polarization TRN Measurement. The confirmation procedure may be performed by exchanging messages between the receiver 204 and the transmitter 202, or broadcasting messages by the transmitter 202 and the receiver 204.

The LOS determination request indicating whether the dual polarization procedure for LOS is used may be the EDMG BRP request. The EDMG BRP request comprises a dual polarization TRN field. The dual polarization TRN field indicates whether the device (which may be the receiver 204 or the transmitter 202 in this example) is sending EDMG BRP request to request for the Dual Polarization TRN.

As an example, the EDMG BRP request may follow the format shown in Table 4.

BRP does not request for the Dual Polarization TRN, and the dual polarization procedure is not used.

The Dual polarization TRN element indicates whether the first device (which may be the receiver 204 or the transmitter 202) sending the EDMG BRP request requests the dual polarization procedure described in FIGS. 6A-B and FIG. 7.

In another example, the Dual polarization TRN element may be included in the header of the EDMG BRP request.

In other example, the indication that indicates whether a dual polarization procedure is used may be included in receive vector (RXVECTOR) parameters or the receive vector (TXVECTOR) parameters. The RXVECTOR parameters are received by the receiver 204, and the RXVECTOR

TABLE 4

Third example EDMG BRP request format.

| B0 B7 Element ID | B8-B15 Length | B16-B23 Element ID Extension | B24-B31 L-RX | B32-B39 L-TX-RX | B40-B50 TX Sector ID | B51-B52 EDMG TRN-Unit P | B53-B56 EDMG TRN-Unit M | B57-B58 EDMG TRN-Unit N |
|---|---|---|---|---|---|---|---|---|
| Bits: 8 | 8 | 8 | 8 | 8 | 11 | 2 | 4 | 2 |
| B59 ... | B60 | | B61 B69 | B70 B75 | B76 B83 | B85 | B86 Digital BF request | B87 Dual polarization TRN |
| Bits: | | | | | | | 1 | 1 |

Where, the Dual polarization TRN element (the element may also be a field) in Table 4 indicates whether the first device (which may be the receiver 204 or the transmitter 202) that is sending EDMG BRP request supports the Dual polarization TRN training procedure. The Dual polarization TRN element in Table 4 may also be an indication indicating whether a dual polarization procedure for LOS is used. If the Dual Polarization TRN element is set to a first value, e.g., '1', the Dual Polarization TRN element indicates that a second device receiving the BRP is requested to send the repetitions of TRN sequences with different polarizations for the same antenna weight vector (AWV) beamform. That is, if the first device sending the EDMG BRP requests for the Dual Polarization TRN, the dual polarization procedure is used. If the Dual Polarization TRN element is set to a second value, e.g., '0', the Dual Polarization TRN element indicates that the TRN may be sent without polarization change per each AWV, which means that the TRN should be sent with one polarization. That is, if the device sending the EDMG parameters present a physical layer (PHY) interaction during receiving of various physical layer convergence protocol (PLCP) protocol data unit (PPDU) formats. The RXVECTOR parameters are parameters for the receiver 204. The TXVECTOR parameters are parameters for the transmitter 202. The TXVECTOR parameters present a PHY interaction during transmitting of the various PPDU formats.

The indication that indicates whether a dual polarization procedure for LOS is used is included by the RXVECTOR parameters or the TXVECTOR parameters is presented in Table 5.

TABLE 5

RXVECTOR and TXVECTOR dual polarization procedure indicator.

| DUAL POLARIZATION_TRNS | FORMAT is EMDG | When set to 1, which indicates that the TRN field appended to this packet comprising the TRN shall have different polarizations per same AWV (beamform). When set to 0, which indicates the TRN field appended to this packet comprising the TRN are without polarization change per each AWV (beamform) | Y | Y |
|---|---|---|---|---|

The DUAL POLARIZATION_TRNS element in the RXVECTOR parameters or the TXVECTOR parameters, conveys whether the TRN field appended to this packet has at least two different polarizations for each AVW. If the DUAL POLARIZATION_TRNS element in the RXVEC- TOR parameters or the TXVECTOR parameters is set to a first value, e.g., '1', then it is indicated that the TRN field appended to the packet comprising the TRN has different polarizations for each beamform. If the DUAL POLARIZATION_TRNS element in the RXVECTOR parameters or the TXVECTOR parameters is set to a second value, e.g., '0', then it is indicated that the TRN field appended to the packet has one polarization.

In other example, the indication that indicates whether a dual polarization procedure for LOS is used may be included in an EMDG-Header-A field. The EMDG-Header-A field is a field structure and definition for a single user (SU) PPDU. The indication that indicates whether a dual polarization procedure for LOS included in the EMDG-Header-A field may be a Dual Polarization TRN training element and an example of which is presented in Table 6 as follows:

TABLE 6

Example dual polarization procedure indicator for a EMDG-Header-A field.

| Dual Polarization TRN Training | 1 | 48 | When set to 1, and field Number of spatial streams (SS) equals 0 indicates that the TRN field sequences appended to this packet have different polarization for the same sector (AWV). When set to 0 and field Number of SS equals 0 indicates that TRN field sequences appended to this packet are without polarization change per each AWV (beamform). This field is reserved if the Number of SS field is greater than 0. |
|---|---|---|---|

The Dual Polarization TRN Training element included in the EMDG-Header-A field indicates whether consecutive TRN units for each AVW appended to the packet have different polarizations. The TRN field enables the transmitter and the receiver to perform AWV training. If the Dual Polarization TRN Training element included in the EMDG-Header-A field is set to a first value, e.g., '1', then it is indicated that the TRN field appended to the packet has different polarizations for each beamform. If Dual Polarization TRN Training element included in the EMDG-Header-A field is set to a second value, e.g., '0', then it is indicated that the TRN field appended to the packet has one polarization for each beamform. If the Dual Polarization TRN Training element included in the EMDG-Header-A field is set to a first value, e.g., '1', it also indicated that the dual polarization procedure for LOS is used.

In other example, the indication that indicates whether a dual polarization procedure for LOS is used may be included in an EMDG-Header-A2 subfield. The EDMG-Header-A2 subfield is transmitted in the second low density parity check (LDPC) codeword. The indication that indicates whether a dual polarization procedure for LOS included in the EMDG-Header-A2 subfield may be a Dual Polarization TRN training element, and an example of which is presented in Table 7 as follows:

The Dual Polarization TRN training element included in the EMDG-Header-A2 subfield indicates whether the TRN units appended to this packet for each AVW have different polarizations. If the Dual Polarization TRN training element included in the EMDG-Header-A2 subfield is set to a first value, e.g., '1', then it is indicated that the TRN field appended to the packet has different polarizations for each beamform. If Dual Polarization TRN Training element included in the EMDG-Header-A2 subfield is set to a second value, e.g., '0', then it is indicated that the TRN field appended to the packet has one polarization for each beamform. If the Dual Polarization TRN Training element included in the EMDG-Header-A2 subfield is set to a first value, e.g., '1', it also indicates that the dual polarization procedure for LOS is used.

In Table 7, the "1" indicates the Dual polarization TRN training element is one bit long, and the "6" indicates the bit position of the Dual polarization TRN training element. In Table 6, the "1" indicates the Dual polarization TRN training element is one bit long, and the "48" indicates the bit position of the Dual polarization TRN training element.

In other example, the indication that indicates whether a dual polarization procedure for LOS is used may be included in a Dual Polarization TRN Supported subfield of beamforming capability field format. The indication that indicates whether a dual polarization procedure for LOS is used included the Dual Polarization TRN Supported subfield of beamforming capability field format may be a Dual Polarization TRN Supported element, and an example of which is presented in Table 8 as follows:

TABLE 7

Example dual polarization procedure indicator for an EMDG-Header-A2 field.

| Dual Polarization TRN Training | 1 | 6 | When set to 1 indicates that the TRN field sequences appended to this packet have different polarization for the same sector (AWV). When set to 0 indicates that TRN field sequences appended to this packet are without polarization change per each AWV (beamform) |
|---|---|---|---|

TABLE 8

Example dual polarization procedure indicator in a subfield of beamforming capability field format.

| | B9 First Path Training Supported | B11 Hybrid Beamforming and MU-MIMO Supported | B12 Hybrid Beamforming and SU-MIMO Supported | B13 Dual Polarization TRN Supported | B14B17 Dual Polarization Power Difference | B18-B23 Reserved |
|---|---|---|---|---|---|---|
| Bits: | 1 | 1 | | | 5 | 1 |

The Dual Polarization TRN Supported element included in the subfield of beamforming capability field format indicates whether enable for Dual polarization TRN procedure. If the Dual polarization TRN element is set to a first value, e.g., '1', then it is indicated to enable the Dual polarization TRN procedure, the TRN sequences may be transmitted with different polarizations, which means that the Dual polarization TRN procedure is used. If the Dual Polarization TRN Supported element is set to a second value, e.g., '0', then it is indicated to not enable the Dual polarization TRN procedure, the TRN sequences may be transmitted with one polarization, which means that the Dual polarization TRN procedure is used.

The Dual Polarization Power Difference subfield indicates a radiated power difference of each of the polarization. The Dual Polarization Power Difference may be indicated as shown in Table 8.

The Dual Polarization TRN Supported element and the Dual Polarization Power Difference may also be a dual polarization TRN capability field, and an example of which is presented in Table 9 as follows:

TABLE 9

Example dual polarization TRN capability field.

| | Dual Polarization TRN Supported | TRN Power difference |
|---|---|---|
| Bits | 1 | 3 |

The indication that indicates if a dual polarization procedure for LOS is used is included in dual polarization TRN capability field format, and is shown in Table 8. The indication may also indicate whether to support for the Dual polarization TRN procedure. If the Dual polarization TRN element is set to a first value, e.g., '1', then it is indicated that the Dual polarization TRN procedure is supported, and the TRN sequences may be transmitted with different polarizations. If the Dual polarization TRN element is set to a second value, e.g., '0', then it is indicated that the Dual polarization TRN procedure is supported, and the TRN sequences may be transmitted with one polarization.

In other example, the indication whether a dual polarization procedure for LOS is used may be included in a DMG Beam Refinement element. The DMG Beam Refinement element may refer to FIG. 9-512 of IEEE 802.11, which is hereby incorporated herein by reference. The Dual polarization TRN element may replace a reserved bit in the same figure.

The dual polarization TRN element in the a DMG Beam Refinement element (which is shown in FIG. 9-512) may be EDMG Dual Polarization TRN Channel Measurement Present. The EDMG Dual Polarization TRN Channel Measurement Present equal to a first value, e.g., '1", indicates that the EDMG Channel Measurement Feedback element contains the Dual Polarization TRN Measurement field. When EDMG Dual Polarization TRN Channel Measurement Present equal to a second value, e.g., '0', indicates that the EDMG Channel Measurement Feedback element does not contain the Dual Polarization TRN Measurement field.

The Dual Polarization Power Difference subfield indicates the radiated power difference between different polarizations. The TRN Power Difference indicates, in dB, the difference in a radiated power for the consecutive TRNs sequences with different polarizations.

Example radiated power differences between the first TRN subfield and the second TRN subfield values are shown in Table 10.

TABLE 10

Example first TRN subfield and second TRN subfield value differences.

| TRN Power difference bits | TRN power difference between the first TRN polarization and the second TRN polarization(dB) |
|---|---|
| 000 | 0 |
| 001 | 1 |
| 010 | 2 |
| 011 | 3 or larger |
| 101 | −1 |
| 110 | −2 |
| 111 | −3 |
| 100 | −4 or smaller |

The polarization described in relation with the discussion of FIGS. 6A, 6B, and 7, and Tables 3-10 specifies details for the dual polarizations procedure. Dual polarization comprises two polarizations, for example. In the dual polarization procedure for LOS determination, the same TRN (the same bit sequence in wave signals) is sent in the same directions with the two different polarizations, one of the two polarizations may be referred to the first polarization, the other of the two polarizations may be referred to the second polarization. Therefore the first TRN is the first polarization transmitted TRN in the direction, the second TRN is the second polarization transmitted TRN in the same direction.

The polarization described from FIGS. 2A to 4C, and FIG. 5, and Tables 1 and 2 is different polarizations for different directions, such as a vertical polarization, a horizontal polarization and a 45 degrees polarization. Different direction polarizations correspond to different paths.

In other example, the procedure of LOS determination described in FIGS. 2A to 3C, FIG. 5, and Tables 1 and 2 may be combined with the procedure of LOS determination described in FIGS. 6A, 6B, and 7, and Tables 3-10. The LOS determining request described in steps 402, 402', 402", 602, 602', and 702, may comprise the indication indicating if a dual polarization procedure is used, and may be combined with first path training.

If the receiver 204 and transmitter 202 confirm both of the transmitter 202 and the receiver 204 support the Dual polarization TRN procedure and the indication of first path training via the message, the packet comprises an indication that indicates the use of the First Path beamforming training and the indication that indicates the use of a dual polarization procedure is used.

When the LOS procedure utilizes only two different polarizations transmissions of the same TRN sequence, the procedure is referred to as Dual Polarization TRN.

As previously stated a Dual Polarization TRN procedure involves transmitting twice the same TRN sequence at different polarization and the receiver measuring the received signal at each polarization.

The Dual Polarization TRN procedure (for LOS) can be combined with the First Path Training or not.

If the Dual Polarization TRN procedure is combined with the First Path Training the receiver will measure only the first received copy (tap) for each polarizations transmission. In order to do this the transmission of the EDMG BRP Request should have enabled both First Path BF and Dual Polarization TRN procedures.

Embodiment solutions may be used in Third Generation Partnership Project (3GPP) New Radio (NR) applications, where obtaining accurate location information may be an important consideration. The potential commercial applications of accurate location may, for example, apply to indoor positioning using millimeter wavelength (mmW) access points. Having information about the characterization of the path (or LOS or NLOS propagation) can be used to improve accuracy of location methods. For instance, a UE may identify whether or which received beam (or ray) is LOS, and performs positioning using LOS beams (or rays) only. In some example embodiments, the previously described technique of LOS determination may be applied using polarization for NR. While the description is made for mmW propagation (frequency range two (FR2)), it is also applicable to microwave propagation (frequency range one (FR1)).

The 3GPP standardized multiple positioning techniques for Long Term Evolution (LTE). In addition, some new techniques are considered for NR. 3GPP LTE Contribution R1-1809348, which is incorporated herein in its entirety by reference, provides a summary of example positioning techniques. A summary of portions of R1-1809348 is provided below.

In NR, the Enhanced cell identifier (ECID) is to estimate UE location based on the detected cell-ID in combination with assisted measurements which could be the Tx-Rx time difference in type 1 and 2, angle of arrival (AOA) of serving cell, reference signal received power (RSRP), reference signal received quality (RSRQ), and related quality measurements (similar to LTE). The reference signals in NR used in the measurements could be the primary synchronization signal (PSS), the secondary synchronization signal (SSS), the physical random access channel (PRACH), and the sounding reference signal (SRS). Because the LTE common reference signal (CRS) is not supported in NR, NR could use cell-specific reference signals in the downlink for measurements, such as the downlink tracking reference signal (TRS) or the channel state information reference signal (CSI-RS). In NR, the ECID-based positioning could be performed at the UE side with assistance of network data, or at the network side with both UE measurements and gNB measurements.

In NR, the observed time difference of arrival (OTDOA) technique is a downlink positioning method where the UE measures the reference signal time difference (RSTD) of arrival between a reference gNB and neighboring gNBs. The reference signal for positioning in downlink may be flexible, scalable in bandwidth, and available to all UEs. A cell-specific positioning reference signal (PRS), similar to the LTE PRS, is recommended to be defined in the NR downlink to reach the objectives. Related studies include, but not limit to, the design of PRS pattern, sequence design, power boosting, configurable ID, intra or inter-frequency RSTD measurements, support of multi-Transmit-Receive Point (TRP) or cell PRS transmission, and combination with beam management mechanisms to support both FR1 and FR2, and signal procedures. An alternative method, if PRS is not allowed, is to possibly reuse existing NR reference signals (e.g., TRS) with minor changes so that they can perform the same functions as PRS.

In NR, the uplink time difference of arrival (UTDOA) technique is a network-based positioning method that uses the uplink SRS to estimate the RSTD between a reference gNB and neighboring gNBs. The NR UTDOA is a mandatory function because it is well suited to exploit the network data and measurements to estimate high-accuracy location while saving the PRS overhead because multiple gNBs could receive the uplink SRS simultaneously. NR supports beam management and multiple TRPs for both FR1 and FR2, thus NR UTDOA may consider the combination with beam management and multiple TRPs techniques to obtain high-quality UTDOA measurements.

Uplink AOA (UAOA)-based positioning may be used to estimate UE location by measuring the AOAs of the uplink reference signals. The uplink SRS may be used for measuring AOAs in gNBs or TRPs but other reference signals (e.g., the demodulation reference signal (DMRS)) are not excluded. UAOAs may be measured for both elevation and zenith angles in order to attain the 3D location.

The UAOA positioning is triggered by the Location Management Function (LMF) of the NR positioning architecture. The LMF coordinates with the serving cell and related neighboring cells to provide UAOA measurements for location estimation. Related measurements such as number of antennas may be also provided to assess the quality of UAOA measurements and to assist the LMF to perform localization.

Because both UTDOA and UAOA utilize uplink SRS for measurements and positioning, the UAOA-based positioning can apply the similar signaling procedure as performed in UTDOA, but additional design may be considered when both UE and gNBs or TRPs use transmit beamforming (e.g., for FR2 operation).

Downlink angle of departure (DAOD)-based positioning may be used in some situations. Similar to UAOA, it is feasible to estimate UE location in terms of DAODs of multiple gNBs or TRPs. The DAODs are the AODs of the strongest path from the gNBs, and can be measured by the UE. For example, the UE can measure the channel on all available beams received from the gNBs and feedback this information to the network so that the network can determine the AODs of the strongest path. Compared with UAOA, DAOD needs UE assistance for measurement feedback. The downlink reference signals used by UE could be downlink PSS, SSS, CSI-RS, etc.

While the DAOD procedure is different from UAOA, there are a lot of commonalities and a consistent uniform framework for ABP can be standardized.

These techniques can be classified into one of two types of solutions, namely UE-centric solutions and eNB-centric solutions. In UE-centric solutions (e.g., TDOA), the eNB transmits some signals (e.g., reference signals, such as the PRS) that the UE uses to perform measurements. The UE then reports these measurements. In eNB-centric solutions (e.g., UTDOA), the eNB performs measurements of signals or messages sent by the UE. In NR, the solutions may be classified into one of two types, UE-centric or gNB-centric (which is similar to eNB-centric in LTE) solutions.

Example embodiments provide LOS determination using UE-centric solutions. For OTDOA in LTE, the eNB sends a reference signal (e.g., the PRS) that the UE uses to determine the time of arrival. Measurements are performed for multiple eNBs, and time differences between eNBs are reported to the serving eNB. The PRS configuration is performed using RRC signaling. The RSTD measurements made by the UE are also sent by RRC signaling. It is reasonable to assume a similar approach for NR, although the signaling details could be different (e.g., sent in a physical layer message such as downlink control information (DCI), uplink control information (UCI), through MAC messages, etc.).

Figure 8A:
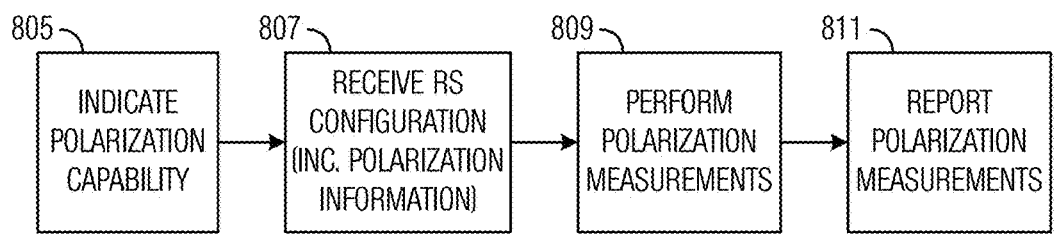
FIG. 8A illustrates a flowchart of an example method for UE operations in a UE-centric solution according to example embodiments presented herein.

FIG. 8A illustrates a flowchart 800 of an example method for UE operations in a UE-centric solution. The UE sends an indication that it has the capability to perform LOS measurements with signals having different polarizations (block 805). The capability to perform LOS measurements may mean that the UE can perform measurements, for example. An OTDOA capability may be defined as follows:

```
OTDOA-PositioningCapabilities-r10    ::= SEQUENCE {
otdoa-UE-Assisted-r10                ENUMERATED {supported}
interFreqRSTD-Measurement-r10        ENUMERATED {supported}  OPTIONAL
}
```

An OTDOA-PositioningCapabilities capability may be defined, and a LOS-ue-assisted field could be added to indicate whether the UE supports LOS determination or not.

The UE receives a RS, e.g., the PRS, configuration (block 807). In LTE, the PRS configuration is received through a higher-layer message. The RRC signaling indicates a measurement gap where the UE can expect the PRS. This procedure can be extended in several ways. In one example, the measurement gap is extended so that the UE can perform two measurements during the gap (one for a first polarization (e.g., the horizontal polarization), and one for a second polarization (e.g., the vertical polarization)). The length of the measurement gap depends on a number of factors including the numerologies of the RS for positioning, the transmission duration (in terms of number of orthogonal frequency division multiplexed (OFDM) symbols), extra time needed for propagation delay uncertainty, and etc. In this case, the two PRS is multiplexed in a TDM manner onto the time and frequency resources at the transmitter.

The length, duration, or interval of the measurement gap is for a single measurement, but the UE is expected to perform the two measurements simultaneously. For such a situation, two different PRS sequences need to be sent at the same time: PRS_hor for horizontal polarization, and PRS_ver for the vertical polarization. These two PRS sequences (or resources) may be multiplexed at the transmitter in a frequency division multiplexed (FDM) or code division multiplexed (CDM) manner onto the time and frequency resources defined as resource elements for NR.

There are two separate gaps configured: one for PRS_hor, one for PRS_ver. However, this solution may only work for nomadic or stationary scenarios, because in order to determine if a ray is LOS, the UE may generally receive signal with substantially the same channel when the gNB transmits with horizontal or vertical polarizations.

The UE performs measurements (block 809). In order to perform measurements, the UE may generally receive a known RS. A RS is generally defined by a bit sequence and its mapped time and frequency resources which is a set of resource elements. For LTE, a unique positioning reference signal is defined, the PRS.

Because the UE has to perform measurements for both polarizations, the UE needs to be able to know with which polarization angle the gNB transmitted the signal. There are several ways to do this:

Two different PRS sequences may be defined: PRS_hor and PRS_ver. If the two sequences are orthogonal, the UE can even simultaneously and independently measure the signals for both polarizations. One simple way to achieve that is to scramble a given PRS sequence with different orthogonal codes for the horizontal polarization and vertical polarization transmissions.

The same sequence may be sent at two different time instances, which are known by the UE. The time instances may generally be close enough so that the channel does not substantially change.

In one example embodiment, a set of two reference signal resources can be defined with one resource defined for PRS_hor and another resource defined for PRS_ver. In another example embodiment, a reference signal of two antenna ports can be defined with one antenna port defined for horizontal polarization measurement and another defined for vertical polarization measurement.

The reflectance (i.e., the intensity reflection coefficient) is the square of the amplitude reflection coefficient. From the Fresnel equations and the Snell's law, it is possible to derive the reflectance coefficients for the parallel and orthogonal polarizations as follows:

$$R_\| = \frac{\tan^2(\theta_i - \theta_t)}{\tan^2(\theta_i + \theta_t)}$$

$$R_\perp = \frac{\sin^2(\theta_i - \theta_t)}{\sin^2(\theta_i + \theta_t)}$$

Where the angle of the incidence at the reflection surface between a first medium and a second medium is $\theta\_i$, and $\theta\_t$ is the angle of transmission into the second medium. For the electromagnetic wave travelling from a medium of lower to higher index of refraction the difference $\theta\_i - \theta\_t$ is positive. The main observation for the purpose of this disclosure is that the reflected coefficients for the parallel and orthogonal polarizations are different.

A UE measurement needs to be defined for LOS detection. The Table 11 presents the UE measured reference signal time difference (RSTD) for OTDOA.

TABLE 11

UE measured RSTD for OTDOA.

| | |
|---|---|
| Definition | The relative timing difference between the neighbour cell j and the reference cell i, defined as $T_{SubframeRxj} - T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference shall be the antenna connector of the UE. |
| Applicable for | RRC_CONNECTED intra-frequency<br>RRC_CONNECTED inter-frequency<br>RRC_IDLE intra-frequency only applicable for NB-IoT UEs<br>RRC_IDLE inter-frequency only applicable for NB-IoT UEs |

For LOS detection, different measurements may be defined. In one example embodiment, the measurement is a difference or ratio of the RSRP measured on the two PRSs resources or antenna ports at the same receive time. As the UE usually experiences multipath propagation environments, RSRPs and their ratio need to be measured for a same path of the multiple paths. In the case of cross-polarized antennas at the UE receiver, the measured RSRPs of each PRS for this path on the antennas of both polarizations need to be summed together. The measurements at UE are performed for the first received path, because the first received path is the candidate for the LOS propagation. How to distinguish between the first received path and the next received path is a matter of implementation where the noise and resolution could impact the identity of the first received path. The UE may report the measured RSRP for each PRS, the difference or ratio of the RSRPs between the two PRSs, or an indication of the path characterization (e.g., LOS or NLOS) where the indication can be binary (i.e., LOS or NLOS) or multiple levels to show the likelihood or confidence of its estimation of LOS or NLOS. In another example embodiment, the UE only report the TOA (or RSTD) for TRPs or cells that it deems to have LOS communication between the UE and the TRP or cell.

It may be useful to first define a UE measurement of received power of a RS on a single path of the multiple channel, which is shown in Table 12. This is a different measurement from what is defined in the current 3GPP specification of RSRP where received power of all paths are considered together as shown in the following definition from 3GPP TS 38.215 V15.2.0, which is herein incorporated by reference in its entirety. In some examples, the capability of the UE to measure the first path may be communicated to the eNB. If the UE cannot measure the first path, but could measure just the aggregate of all paths, the LOS procedure could still take place, however the LOS determination may be successful only in the particular situation when there are no reflections, i.e., only direct propagation, which is a less likely situation. The eNB may be aware of the UE limitation via a previous capability exchange.

TABLE 12

UE measurement of RS received power.

| | |
|---|---|
| Definition | CSI reference signal received power (CSI-RSRP), is defined as the linear average over the power contributions (in [W]) of the resource elements that carry CSI reference signals configured for RSRP measurements within the considered measurement frequency bandwidth in the configured CSI-RS occasions.<br>For CSI-RSRP determination CSI reference signals transmitted on antenna port 3000 according to 3GPP TS 38.211 [4] shall be used. If CSI-RSRP is used for L1-RSRP, CSI reference signals transmitted on antenna ports 3000, 3001 can be used for CSI-RSRP determination.<br>For intra-frequency CSI-RSRP measurements, if the measurement gap is not configured, UE is not expected to measure the CSI-RS resource(s) outside of the active downlink bandwidth part.<br>For frequency range 1, the reference point for the CSI-RSRP shall be the antenna connector of the UE. For frequency range 2, CSI-RSRP shall be measured based on the combined signal from antenna elements corresponding to a given receiver branch. For frequency range 1 and 2, if receiver diversity is in use by the UE, the reported CSI-RSRP value shall not be lower than the corresponding CSI-RSRP of any of the individual receiver branches. |
| Applicable for | If CSI-RSRP is used for L1-RSRP,<br>RRC_CONNECTED intra-frequency.<br>Otherwise,<br>RRC_CONNECTED intra-frequency,<br>RRC_CONNECTED inter-frequency |

The number of resource elements within the considered measurement frequency bandwidth and within the measurement period that are used by the UE to determine CSI-RS RSRP is an implementation issue with the limitation that corresponding measurement accuracy requirements have to be fulfilled. The power per resource element is determined from the energy received during the useful part of the symbol, excluding the cyclic prefix (CP).

A new measurement of received power of a reference signal on a single path of the multiple channel can be defined as shown in Table 13.

TABLE 13

RSRP measurement on a single path of a multichannel scenario

| | |
|---|---|
| Definition | Reference signal received power over a path (RSRP-p), is defined as the linear average over the power contributions (in [W]) of the resource elements that carry a reference signals (e.g., a positioning reference signal or a CSI-RS or a set of CSI-RS resources) configured for RSRP-p measurements within the considered measurement frequency bandwidth over a single (first and/or strongest) path in the configured RS occasions. For frequency range 1, the reference point for the RSRP-p shall be the antenna connector of the UE. For frequency range 2, RSRP-p shall be measured based on the combined signal from antenna elements corresponding to a given receiver branch. For frequency range 1 and 2, if multiple polarized antennas or receiver braches are in use by the UE, the reported RSRP-p value shall be the sum of the RSRP-p of any of the individual receiver branches. |

The number of resource elements within the considered measurement frequency bandwidth and within the measurement period that are used by the UE to determine RSRP-p may be left up to the UE implementation with the limitation that corresponding measurement accuracy requirements have to be fulfilled. The power per resource element may be determined from the energy received during the useful part of the symbol, e.g., excluding the CP.

The UE reports the polarization measurements (block 811). UEs may report polarization measurements to the gNB in a higher layer message. The UE may either report two RSRP values (or signal plus interference to noise ratio (SINR), RSRP, received signal strength indicator (RSSI), etc.) to the gNB: a first value for the horizontal polarization, and a second value for the vertical polarization. Alternatively, the UE may report a ratio of these two RSRP values. The UE may also determine on its own the characterization of the path (e.g., using a pre-configured threshold and having the UE comparing an SINR ratio to this threshold) and report it to the gNB.

In an embodiment, the polarization measurements may be included in the same message as the one used to report the RSTD measurements.

In some example embodiments, measurements are performed over the first path however in a different example embodiment the measurement may be performed for the strongest path or a combination of the first and strongest paths.

Figure 8B:
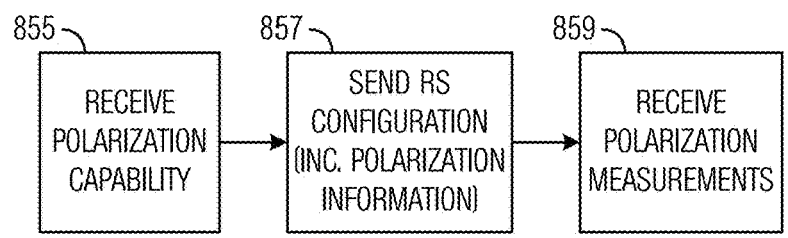
FIG. 8B illustrates a flowchart of an example method for gNB operations in a UE-centric solution according to example embodiments presented herein.

FIG. 8B illustrates a flowchart 850 of an example method for gNB operations in a UE-centric solution. The gNB receives an indication that the UE has the capability to perform LOS measurements with signals having different polarizations (block 855). The gNB sends a RS, e.g., the PRS, configuration (block 857). The RS configuration may be sent using higher layer signaling. The gNB receives polarization measurements (block 859). The polarization measurements may be received in a higher layer message. The report may include two RSRP values (or SINR, RSRP, RSSI, etc.): a first value for the horizontal polarization, and a second value for the vertical polarization. Alternatively, the report may include a ratio of these two RSRP values. The UE may also determine on its own the characterization of the path (e.g., using a pre-configured threshold and having the UE comparing an SINR ratio to this threshold) and the report may include the characterization of the path.

Example embodiments provide LOS determination techniques for gNB-centric solutions. For gNB-centric solutions, the UE transmits with two polarizations, and the gNB performs the measurement of the transmission, in a manner similar to the measurements made by the UE in the UE-centric solutions. The capability to perform LOS measurements may mean that either the gNB or the UE can perform measurements, for example.

Figure 9A:
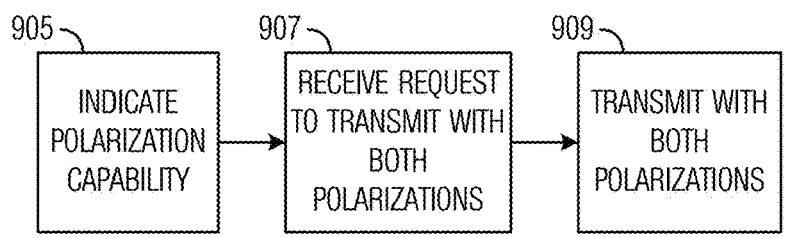
FIG. 9A illustrates a flowchart of an example method for UE operation in a gNB-centric solution according to example embodiments presented herein.

FIG. 9A illustrates a flowchart 900 of an example method for UE operation in a gNB-centric solution. This operation is similar to the one for the UE-centric procedure, except that the UE indicates its capability to transmit with two polarizations instead of receiving with two polarizations. The UE sends an indication that it has the capability to transmit signals having different polarizations (block 905). The indication may be sent using higher layer signaling, such as in DCI. The UE receives a request to transmit with multiple polarizations (block 907). The request may be received over higher layer signaling. The request may also configure a RS (such as a SRS), polarizations to transmit, resource elements or antenna ports to use, multiplexing (TDM, CDM, FDM, or a combination thereof) to use, and so on. The UE transmits the RS with multiple polarizations (block 909).

With respect to higher layer messaging of the RS configuration, a technique similar to the description of the OTDOA technique may be used. The RS configuration may specify that the UE send an SRS. Just like the PRS, in order to differentiate between the two polarities, two SRS sequences may be needed, and may be obtained by scrambling the SRS with a different sequence for each of the horizontal and vertical polarizations. Different time instances may be used, but the interference experienced at two different time instances may be different. An additional bit may be included in the DCI to indicate that the SRS needs to be transmitted with both polarizations.

Figure 9B:
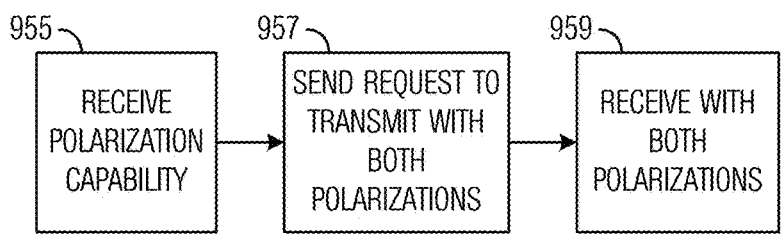
FIG. 9B illustrates a flowchart of an example method for gNB operation in a gNB-centric solution according to example embodiments presented herein.

FIG. 9B illustrates a flowchart 950 of an example method for gNB operation in a gNB-centric solution. The gNB receives an indication that a UE has the capability to transmit signals having different polarizations (block 955). The indication may be sent using higher layer signaling. The gNB sends a request for the UE to transmit a RS with multiple polarizations (block 957). The request may be sent over higher layer signaling. The request may also configure a RS, polarizations to transmit, resource elements or antenna ports to use, multiplexing (TDM, CDM, FDM, or a combination thereof) to use, and so on. The gNB receives the RS with the multiple polarizations (block 959). The RS is received in accordance with the configuration of the RS. In addition to receiving the RS, the gNB makes polarization measurements, which are also made in accordance with the configuration of the RS. The gNB also characterizes the paths in accordance with the polarization measurements. As an example, the gNB compares the polarization measurements with a pre-specified threshold and if the polarization measurements meet the threshold, the UE and gNB are performing LOS communication, else they are performing NLOS communication.

In one example embodiment, a method for signaling to support LOS detection is provided. The signaling may be communicated prior to the association of UE with the access node. Alternatively, the signaling may be communicated after or during the association of UE with the access node. For WLAN technology such as IEEE 802.11 compliant devices, an information element (IE) can have a field, for instance, a bit, that signals the support of the LOS detection feature. The IE could be provided in Probe Request frames, Probe Response frames, (Re) Association Request frames, (Re) Association Response frames, Beacons frames, or other type of management or action frames.

In another example embodiment, a method for transmitting multiple transmissions with different polarizations is provided. The transmission may be simultaneous or sequential, and may use the same power for each polarization or a set of known and pre-established powers for each polarization.

In another example embodiment, a method for receiving multiple transmissions with different polarizations is provided. In one example, the receiver is able to receive in each of the transmitted polarization planes and discriminate between copies of the transmitted signals (beams or rays), and where the receiver compares the received power of the first received ray for each corresponding transmitted polarization.

Other example embodiments include: (1) a method where the receiver decides that if the received powers for the first received ray for various polarizations are the same, the transmitter and the receiver are LOS, otherwise the transmitter and the receiver are NLOS; (2) a method where the receiver uses the first ray received in LOS communication to determine the distance between transmitter and the receiver using the ToF of the communication; (3) a method where the receiver determines if the first received ray is LOS or NLOS and communicates the characterization back to the transmitter; (4) a method where the transmitter is informed if the communication is LOS or NLOS and use the ToF to determine the distance between the transmitter and the receiver; (5) a method where a receiver determines if the first receive ray (copy of the signal) is LOS and use the information of the direction of arrival (DOA) of the first ray to determine the angle of the transmitter location; (6) a method to determine the change of LOS communication, where receiver initiates a handover to a new LOS communication with a different transmitter if the current LOS communication becomes NLOS; (7) a method to determine the change from LOS to NLOS communication and to report the change to the second device, for instance, a base station or AP, where the second device sends a control (e.g., link management) message to trigger the handover to a new LOS communication link with a different device (e.g., an AP); (8) a method to periodically assess the LOS or NLOS status of a communication with multiple devices and to decide to switch the communication to a LOS device; (9) a method for a device to periodically assess the LOS or NLOS status of a communication with a second device for the purpose of remote control of the second device and modify the trajectory of the second device to maintain the LOS or NLOS communication status; (10) a method to assess the LOS status, to record the LOS status with respect to location and different communications nodes (base stations, access points, relays, access nodes, etc) and use it later for fast discovery and fast attachment such as antenna beamforming on the direction of LOS, or recovery when the LOS communication gets obstructed to alternate LOS directions of communications; (11) a method where the device is communicating using beamforming towards a known LOS communication direction for fast discovery, and if the discovery fails it searches in adjacent directions of LOS. Other examples are also possible.

Figure 10:
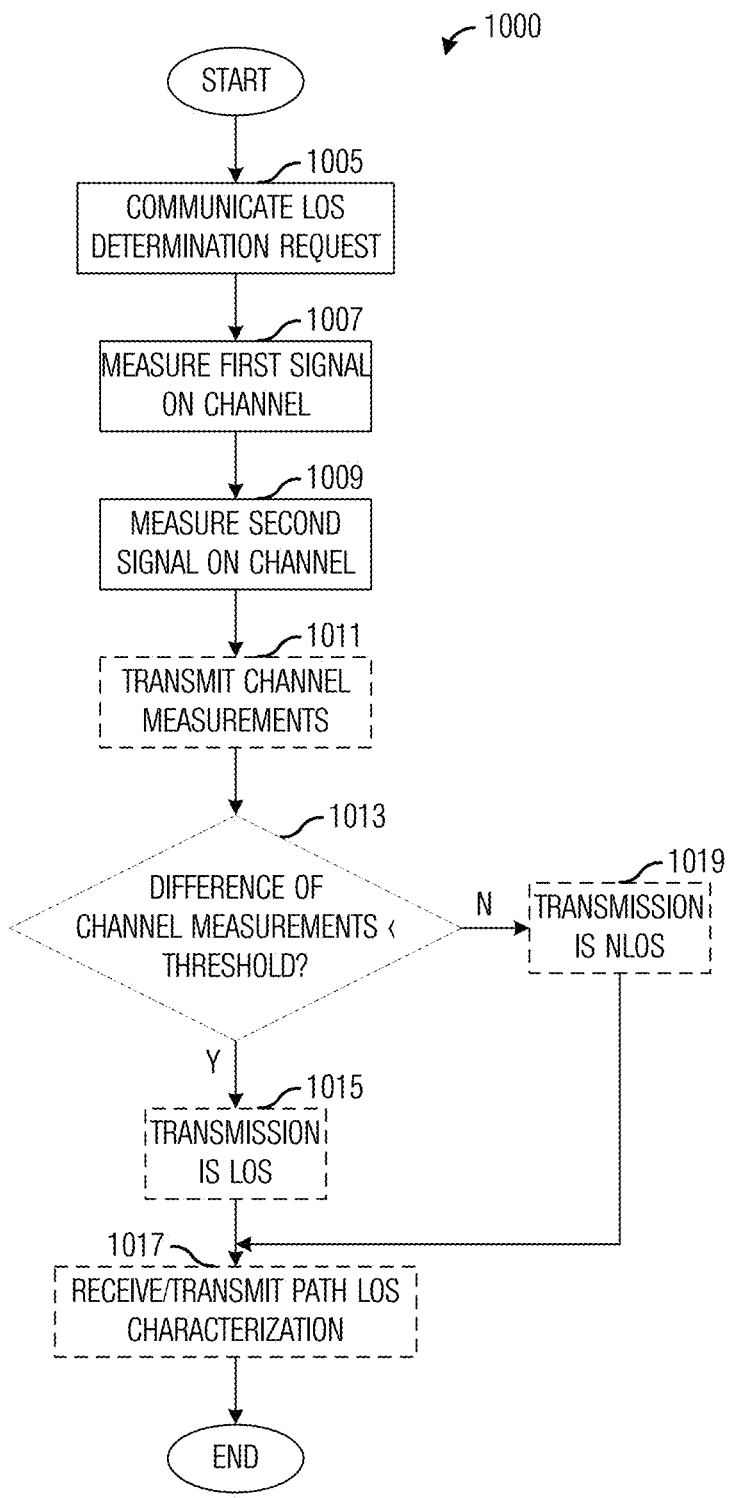
FIG. 10 illustrates a flow diagram of example operations occurring in a UE in a UE-centric LOS measurements solution according to example embodiments presented herein.

FIG. 10 illustrates a flow diagram of example operations 1000 occurring in a UE in a UE-centric LOS measurements solution. Operations 1000 may be indicative of operations occurring in a UE as the UE participates in a UE-centric LOS measurements solution.

Operations 1000 begin with the UE communicating a LOS determination request (block 1005). The UE may send the LOS determination request to the gNB or receive the LOS determination request from the gNB. The LOS determination request, when received from the gNB, may include a RS configuration. The UE measures the first signal on the channel (block 1007). The first signal may be a bit sequence with a first polarization. Copies of the first signal may be received on one or more paths. The UE measures the second signal on the channel (block 1009). The second signal may be a bit sequence with a second polarization. Copies of the second signal may be received on one or more paths. The UE may transmit the channel measurements to the access node (block 1011). In some embodiments, the UE provides the channel measurements to the gNB, which performs the characterization of the paths itself.

The UE may perform a comparison of a difference of the channel measurements with a pre-specified threshold (block 1013). In some embodiments, the UE characterizes the paths and provides the characterization of the paths to the gNB. If the difference of the channel measurements is less than the threshold, then the path is LOS (block 1015) and the UE transmits the characterization to the gNB (block 1017). If the difference of the channel measurements is greater than the threshold, then the path is NLOS (block 1019) and the UE transmits the characterization to the gNB (block 1017). If the UE did not send channel measurements, the UE may send the characterization of the paths to the gNB (block 1117). Although the discussion focusses on the UE interacting with the gNB, the example embodiments are also operable with other forms of communications controllers, such as APs, access nodes, base stations, etc.

Figure 11:
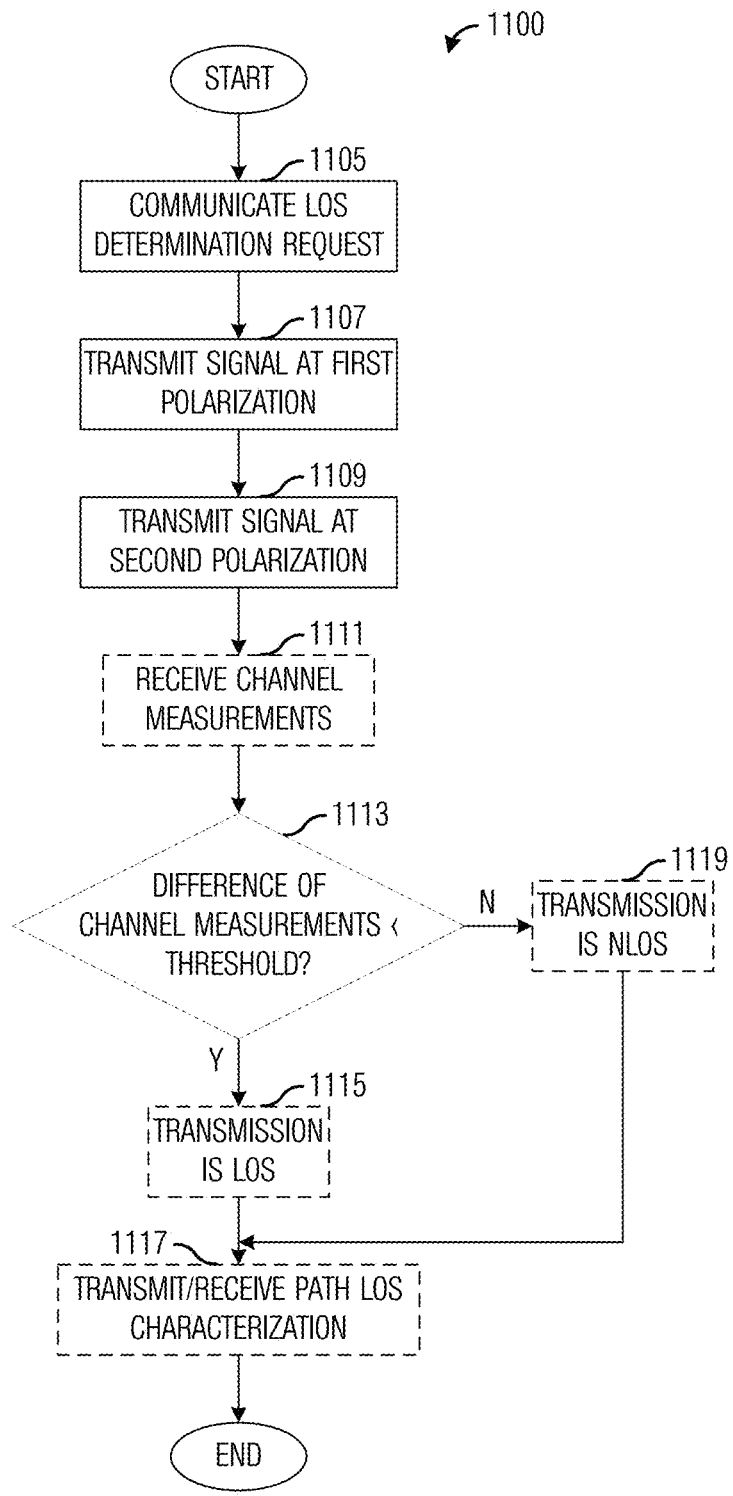
FIG. 11 illustrates a flow diagram of example operations occurring in a gNB in a UE-centric LOS measurements solution according to example embodiments presented herein.

FIG. 11 illustrates a flow diagram of example operations 1100 occurring in a gNB in a UE-centric LOS measurements solution. Operations 1100 may be indicative of operations occurring in a gNB as the gNB participates in a UE-centric LOS measurements solution.

Operations 1100 begin with the gNB communicating a LOS determination request (block 1105). The gNB may send the LOS determination request to the UE or receive the LOS determination request from the UE. The gNB transmits the first signal on the channel (block 1107). The first signal may be a bit sequence with a first polarization. The gNB transmits the second signal on the channel (block 1109). The second signal may be a bit sequence with a second polarization. The gNB may receive the channel measurements from the UE (block 1111). In some embodiments, the UE provides the channel measurements to the gNB, which performs the characterization of the paths itself.

The gNB may perform a comparison of a difference of the channel measurements with a pre-specified threshold (block 1113). In some embodiments, the gNB characterizes the paths and optionally provides the characterization of the paths to the UE. If the difference of the channel measurements is less than the threshold, then the path is LOS (block 1115) and the gNB optionally transmits the characterization to the UE (block 1117). If the difference of the channel measurements is greater than the threshold, then the path is NLOS (block 1119) and the gNB optionally transmits the characterization to the UE (block 1117). If the gNB did not receive channel measurements, the gNB may receive the characterization of the paths from the UE (block 1117). Although the discussion focusses on the UE interacting with the gNB, the example embodiments are also operable with other forms of communications controllers, such as APs, access nodes, base stations, etc.

FIGS. 10 and 11 presented flow diagrams of example operations occurring in a UE and a gNB in a UE-centric LOS measurements solution. Flow diagrams of example operations occurring in a UE and a gNB in a gNB-centric LOS measurements solution would be similar with the exception that the UE would be sending the bit sequences with different polarities and the gNB would be making the channel measurements. Furthermore, in the gNB-centric LOS measurements solution, it would be unlikely for the gNB to send the channel measurements to the UE for the UE to perform the characterization of the paths.

Figure 12:
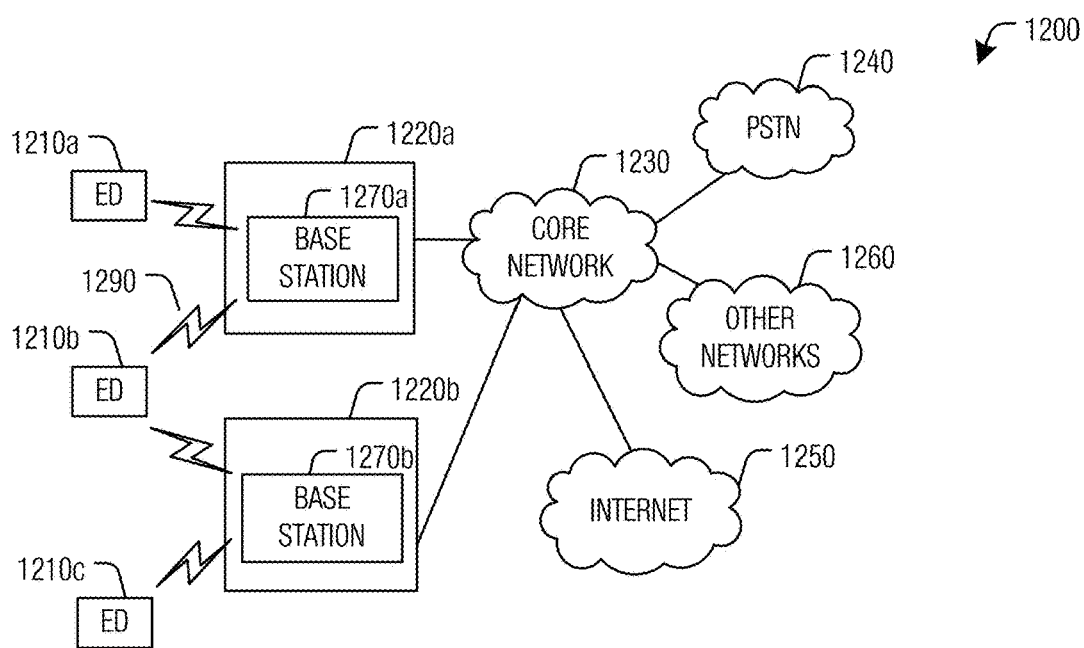
FIG. 12 illustrates an example communication system according to example embodiments presented herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-122b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210a-1210c are configured to interface and communicate with the Internet 1250 and may access the core network 1230, the PSTN 1240, or the other networks 1260.

In the embodiment shown in FIG. 12, the base station 1270a forms part of the RAN 1220a, which may include other base stations, elements, or devices. Also, the base station 1270b forms part of the RAN 1220b, which may include other base stations, elements, or devices. Each base station 1270a-1270b operates to transmit or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
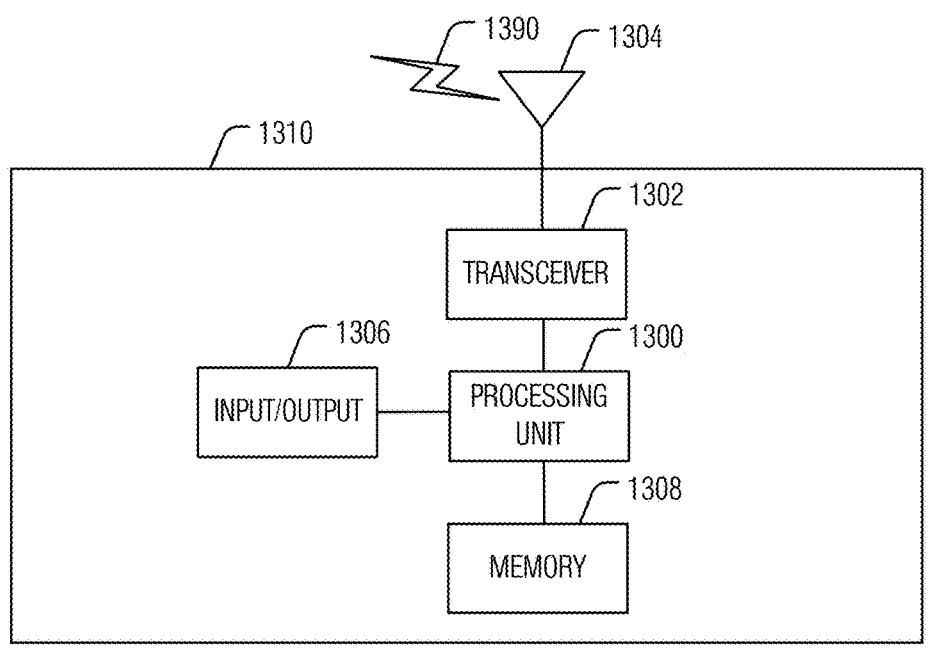
FIGS. 13A and 13B illustrate example devices that may implement the methods and teachings according to this disclosure.
Figure 13B:
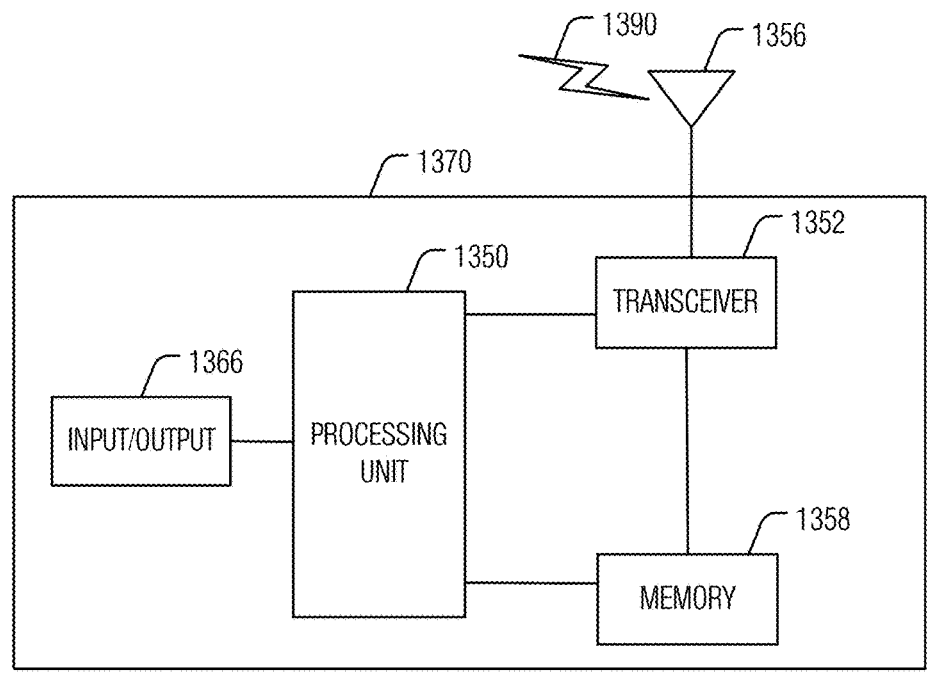

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
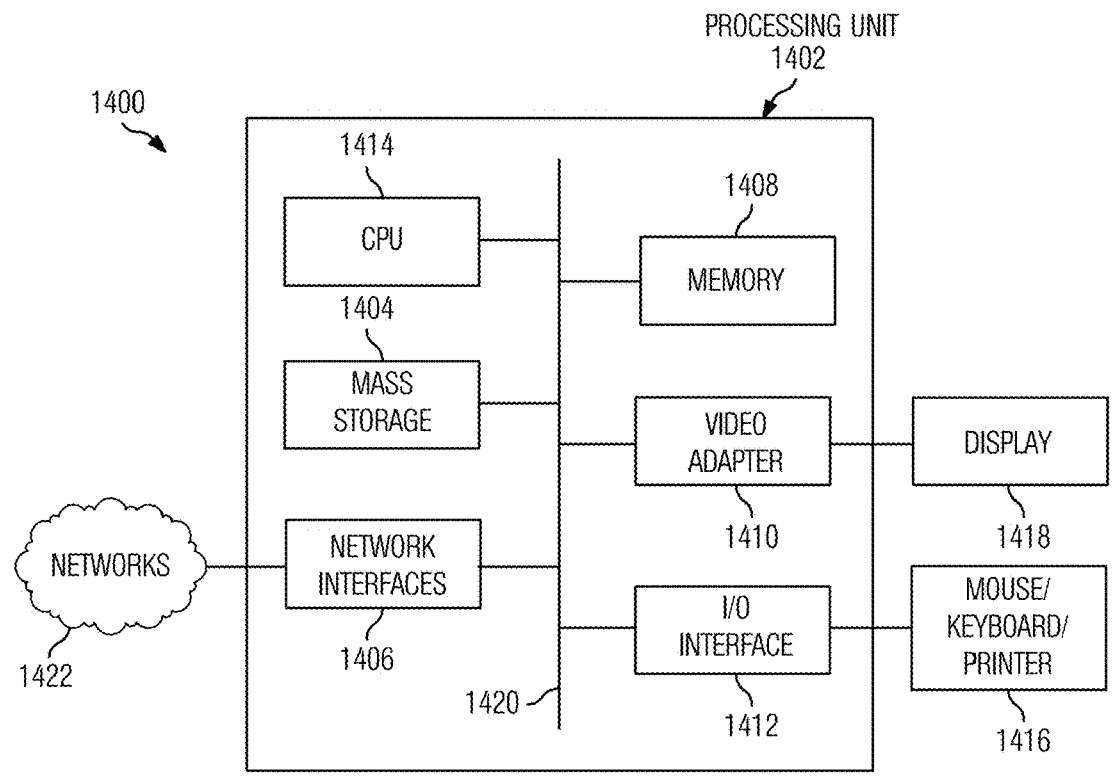
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

Figure 15:
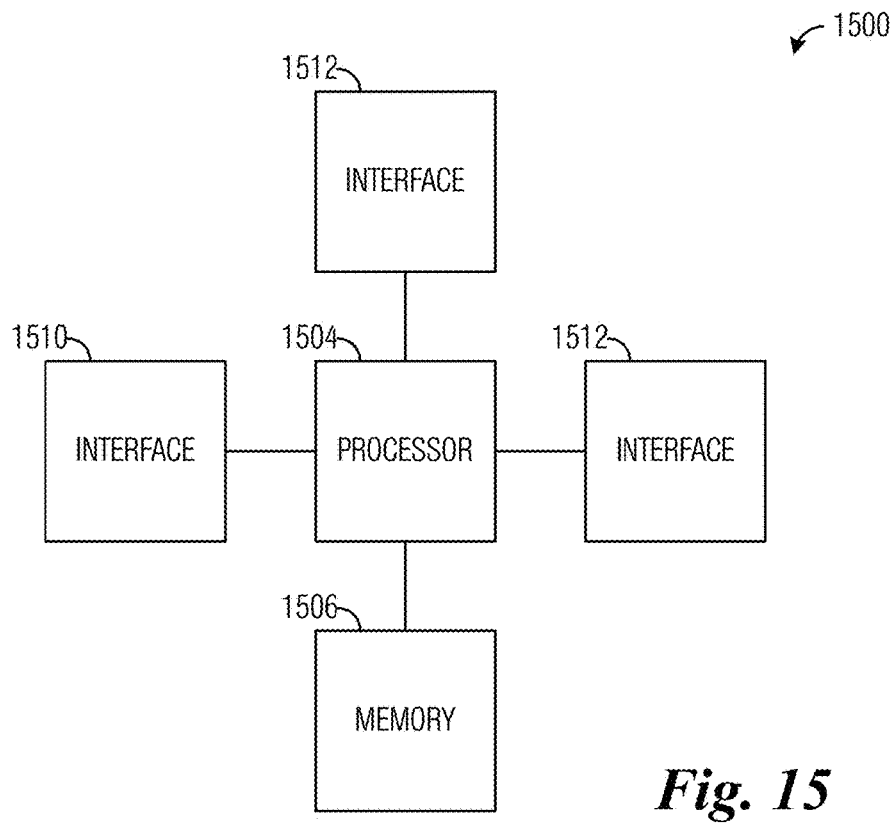
FIG. 15 illustrates a block diagram of an example embodiment processing system for performing methods described herein.

FIG. 15 illustrates a block diagram of an example embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an example embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1100. The processing system 1500 may include additional components not depicted in FIG. 15, such as long term storage (e.g., non-volatile memory, etc.).

In some example embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other example embodiments, the processing system 1500 is in a user-side device accessing a wireless or wireline telecommunications network, such as a mobile station, a UE, a PC, a tablet, a wearable communications device (e.g., a smartwatch, etc.), or any other device adapted to access a telecommunications network.

Figure 16:
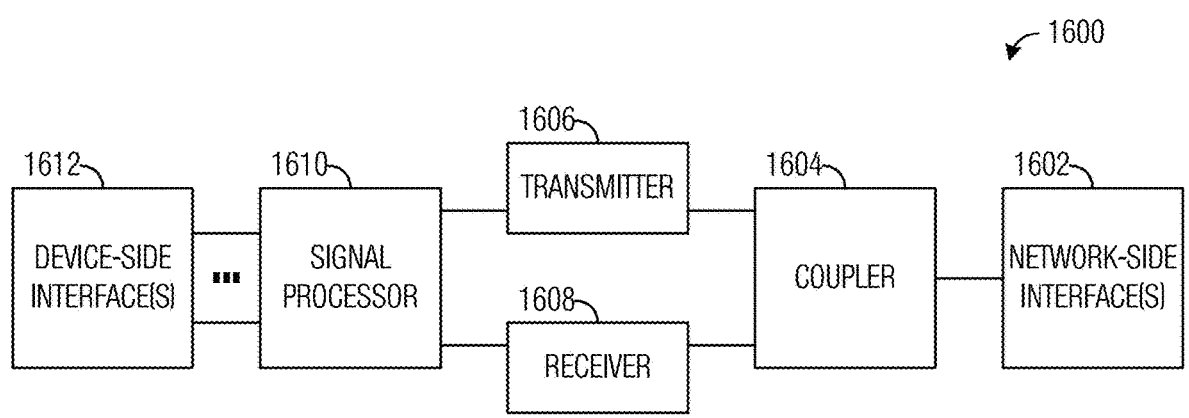
FIG. 16 illustrates a block diagram of a transceiver adapted to transmit and receive signaling over a telecommunications network according to example embodiments presented herein.

In some example embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1210 and components within the host device (e.g., the processing system 1100, local area network (LAN) ports, etc.).

The transceiver 1600 may transmit and receive signaling over any type of communications medium. In some example embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., LTE, etc.), a WLAN protocol (e.g., Wi-Fi, etc.), or any other type of wireless protocol (e.g., Bluetooth, near field communication (NFC), etc.). In such example embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other example embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although a combination of features is shown in the illustrated examples, not all of them need to be combined to realize the benefits of various example embodiments of this disclosure. In other words, a system or method designed according to an example embodiment of this disclosure will not necessarily include all of the features shown in any one of the Figures or all of the portions schematically shown in the Figures. Moreover, selected features of one example embodiment may be combined with selected features of other example embodiments.

In some example embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain example embodiments and generally associated methods, alterations and permutations of these example embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims

The invention claimed is:

1. A method performed by a first device, the method comprising:
communicating, by the first device, with a second device, a line of sight (LOS) determination request including a dual polarization procedure indicator, the dual polarization procedure indicator indicating a dual polarization procedure is to be used in LOS characterization of a transmission between the first device and the second device after the communicating the LOS determination request; and
based on the dual polarization procedure indicator:
measuring, by the first device, a first signal received from the second device on a first resource of a channel, the first signal transmitted using a first polarization;
measuring, by the first device, a second signal received from the second device on a second resource of the channel;
determining, by the first device, the LOS characterization of the transmission based on the measuring the first signal and the measuring the second signal, the second signal transmitted using a second polarization, the first signal comprising a first copy of a bit sequence, the second signal comprising a second copy of the bit sequence, the first polarization and the second polarization being orthogonal polarizations, the first signal and the second signal multiplexed in a frequency domain or a code domain; and
communicating, by the first device, with the second device, a characterization indication,
wherein the characterization indication is one of multiple values communicated by the first device with the second device showing likelihood or confidence of estimation of the transmission comprising an LOS transmission or a non-LOS (NLOS) transmission.

2. The method of claim 1, the measuring the first signal comprising:
measuring, by the first device, a first linear average of first power contributions of the first resource conveying the first signal, and the measuring the second signal comprising:
measuring, by the first device, a second linear average of second power contributions of the second resource conveying the second signal.

3. The method of claim 1, further comprising:
transmitting, by the first device, to the second device, a first measurement of the first signal and a second measurement of the second signal.

4. The method of claim 1, further comprising:
receiving, by the first device, from the second device, the LOS characterization of the transmission.

5. The method of claim 1, further comprising:
determining, by the first device, that a difference between a first measurement of the first signal and a second measurement of the second signal meets a specified threshold, and based thereon,
determining, by the first device, that the LOS characterization of the transmission comprises the LOS transmission.

6. The method of claim 1, further comprising:
determining, by the first device, a difference between a first measurement of the first signal and a second measurement of the second signal does not meet a specified threshold, and based thereon,
determining, by the first device, that the LOS characterization of the transmission comprises the NLOS transmission.

7. The method of claim 1, further comprising:
transmitting, by the first device, the LOS characterization of the transmission.

8. The method of claim 1, wherein the measuring the first signal or the measuring the second signal comprises:
measuring a reference signal received power (RSRP) value or a reference signal received quality (RSRQ) value.

9. The method of claim 1, the communicating the LOS determination request comprising:
transmitting the LOS determination request or receiving the LOS determination request.

10. The method of claim 1, the first device comprising a user equipment (UE), and the second device comprising an access node.

11. The method of claim 1, the LOS determination request further comprises a measurement gap specifying a location of the first resource and the second resource.

12. The method of claim 1, the LOS determination request further comprises a first measurement gap specifying a first location of the first resource, and a second measurement gap specifying a second location of the second resource.

13. The method of claim 1, the first and second signals are scrambled with different orthogonal codes.

14. The method of claim 1,
wherein the characterization indication is a binary value indicating whether the LOS characterization of the transmission comprises the LOS transmission or the NLOS transmission.

15. The method of claim 1, further comprising:
wherein the LOS determination request further indicates a number of transmissions and a number of polarizations, and
wherein the first signal and the second signal are in a single frame transmission.

16. A method performed by a first device, the method comprising:
communicating, by the first device, with a second device, a line of sight (LOS) determination request including a dual polarization procedure indicator, the dual polarization procedure indicator indicating a dual polarization procedure is to be used in LOS characterization of a transmission between the first device and the second device after the communicating the LOS determination request; and
based on the dual polarization procedure indicator:
transmitting, by the first device, a first signal on a first resource of a channel using a first polarization;
transmitting, by the first device, a second signal on a second resource of the channel using a second polarization, the first signal comprising a first copy of a bit sequence, the second signal comprising a second copy of the bit sequence, the first polarization and the second polarization being orthogonal polarizations, the first signal and the second signal multiplexed in a frequency domain or a code domain; and
communicating, by the first device with the second device, a characterization indication,
wherein the characterization indication is one of multiple values communicated by the first device with the second device showing likelihood or confidence of estimation of the transmission comprising an LOS transmission or a non-LOS (NLOS) transmission.

17. The method of claim 16, further comprising:
receiving, by the first device, from the second device, a first measurement of the first signal and a second measurement of the second signal.

18. The method of claim 17, further comprising:
determining, by the first device, that a difference between the first measurement of the first signal and the second measurement of the second signal meets a specified threshold, and based thereon,
determining, by the first device, that the LOS characterization of the transmission comprises the LOS transmission.

19. The method of claim 17, further comprising:
determining, by the first device, that a difference between the first measurement of the first signal and the second measurement of the second signal does not meet a specified threshold, and based thereon,
determining, by the first device, that the LOS characterization of the transmission comprises the NLOS transmission.

20. The method of claim 18, further comprising:
transmitting, by the first device, the LOS characterization of the transmission.

21. The method of claim 16, further comprising:
receiving, by the first device, from the second device, a LOS characterization of the channel.

22. The method of claim 16, wherein the communicating the LOS determination request comprises:
transmitting the LOS determination request or receiving the LOS determination request.

23. The method of claim 16,
wherein the characterization indication is a binary value indicating whether the LOS characterization of the transmission comprises the LOS transmission or the NLOS transmission.

24. A first device comprising:
a non-transitory memory storage comprising instructions; and
one or more processors in communication with the non-transitory memory storage, the one or more processors execute the instructions to cause the first device to perform operations including:
communicating, with a second device, a line of sight (LOS) determination request including a dual polarization procedure indicator, the dual polarization procedure indicator indicating a dual polarization procedure is to be used in LOS characterization of a transmission between the first device and the second device after the communicating the LOS determination request, and
based on the dual polarization procedure indicator:
measuring a first signal received from the second device on a first resource of a channel, the first signal transmitted using a first polarization,
measuring a second signal received from the second device on a second resource of the channel,
determining the LOS characterization of the transmission based on the measuring the first signal and the measuring the second signal, the second signal transmitted using a second polarization, the first signal comprising a first copy of a bit sequence, the second signal comprising a second copy of the bit sequence, the first polarization and the second polarization being orthogonal polarizations, the first signal and the second signal multiplexed in a frequency domain or a code domain, and
communicating with the second device, a characterization indication,
wherein the characterization indication is one of multiple values communicated by the first device with the second device showing likelihood or confidence of estimation of the transmission comprising an LOS transmission or a non-LOS (NLOS) transmission.

25. The first device of claim 24, the operations further comprising:
transmitting, to the second device, a first measurement of the first signal and a second measurement of the second signal.

26. The first device of claim 24, the operations further comprising:
receiving, from the second device, the LOS characterization of the transmission.

27. The first device of claim 24, the operations further comprising:
determining that a difference between a first measurement of the first signal and a second measurement of the second signal meets a specified threshold, and based thereon,
determining that the LOS characterization of the transmission comprises the LOS transmission.

28. The first device of claim 24, the operations further comprising:
determining a difference between a first measurement of the first signal and a second measurement of the second signal does not meet a specified threshold, and based thereon
determining that the LOS characterization of the transmission comprises the NLOS transmission.

29. The first device of claim 24, the operations further comprising:
transmitting the LOS characterization of the transmission.

30. The first device of claim 24, the communicating the LOS determination request comprising:
transmitting the LOS determination request or receiving the LOS determination request.

31. The first device of claim 24,
wherein the characterization indication is a binary value indicating whether the LOS characterization of the transmission comprises the LOS transmission or the NLOS transmission.

32. A first device comprising:
a non-transitory memory storage comprising instructions; and
one or more processors in communication with the non-transitory memory storage, the one or more processors execute the instructions to cause the first device to perform operations including:
communicating, with a second device, a line of sight (LOS) determination request including a dual polarization procedure indicator, the dual polarization procedure indicator indicating a dual polarization procedure is to be used in LOS characterization of a transmission between the first device and the second device after the communicating the LOS determination request, and
based on the dual polarization procedure indicator:
transmitting a first signal on a first resource of a channel using a first polarization,
transmitting a second signal on a second resource of the channel using a second polarization, the first signal comprising a first copy of a bit sequence, the second signal comprising a second copy of the bit sequence, the first polarization and the second polarization being orthogonal polarizations, the first signal and the second signal multiplexed in a frequency domain or a code domain, and communicating, with the second device, a characterization indication, wherein the characterization indication is one of multiple values communicated by the first device with the second device showing likelihood or confidence of estimation of the transmission comprising an LOS transmission or a non-LOS (NLOS) transmission.

33. The first device of claim 32, the operations further comprising:

receiving, from the second device, a first measurement of the first signal and a second measurement of the second signal.

34. The first device of claim 33, the operations further comprising:

determining that a difference between the first measurement of the first signal and the second measurement of the second signal meets a specified threshold, and based thereon, determining that the LOS characterization of the transmission comprises the LOS transmission.

35. The first device of claim 33, the operations further comprising:

determining that a difference between the first measurement of the first signal and the second measurement of the second signal does not meet a specified threshold, and based thereon, determining that the LOS characterization of the transmission comprises the NLOS transmission.

36. The first device of claim 34 the operations further comprising:

transmitting the LOS characterization of the transmission.

37. The first device of claim 32, the operations further comprising:

receiving, from the second device, a LOS characterization of the channel.

38. The first device of claim 32, wherein the characterization indication is a binary value indicating whether the LOS characterization of the transmission comprises the LOS transmission or the NLOS transmission.

* * * * *